United States Patent [19]
Grant et al.

[11] Patent Number: 5,878,405
[45] Date of Patent: Mar. 2, 1999

[54] PENSION PLANNING AND LIQUIDITY MANAGEMENT SYSTEM

[75] Inventors: James K. Grant, Houston; M. Scott Bassett, Plano, both of Tex.

[73] Assignee: Coordinated Data Services, Inc., Houston, Tex.

[21] Appl. No.: 719,800

[22] Filed: Sep. 25, 1996

[51] Int. Cl.$^6$ .................................................. G06F 15/30
[52] U.S. Cl. ................................ 705/39; 705/35; 705/10
[58] Field of Search ........................... 705/4, 14, 30, 705/35–41; 707/104; 235/379, 380; 395/235; 379/91.01

[56] References Cited

U.S. PATENT DOCUMENTS

| | | |
|---|---|---|
| 4,346,442 | 8/1982 | Musmanno . |
| 4,648,037 | 3/1987 | Valentino .................................. 705/35 |
| 4,718,009 | 1/1988 | Cuervo . |
| 4,858,121 | 8/1989 | Barber et al. . |
| 4,969,094 | 11/1990 | Halley et al. ............................. 705/35 |
| 5,083,270 | 1/1992 | Gross et al. .............................. 705/35 |
| 5,206,803 | 4/1993 | Vitagliano et al. . |
| 5,231,571 | 7/1993 | D'Agostino . |
| 5,323,315 | 6/1994 | Highbloom . |
| 5,383,113 | 1/1995 | Kight et al. . |
| 5,457,305 | 10/1995 | Akel et al. . |
| 5,465,206 | 11/1995 | Hilt et al. . |
| 5,496,991 | 3/1996 | Delfer, III et al. . |
| 5,504,677 | 4/1996 | Pollin . |
| 5,530,232 | 6/1996 | Taylor . |
| 5,550,734 | 8/1996 | Tarter et al. . |

OTHER PUBLICATIONS

Mead; "How to Save Social Security", *Worth*, p. 78(5); Oct. 1995.

"Raiding a Retirement Fund"; *Henry & Company P.C.–Client Line;* p. 1; Nov. 1995.

Willette; "Should You Borrow From Your 401(k)?", *USA Today;* p. 5B, Jun. 21, 1996.

Shutan; "Cashing In On Cashing Out"; *Employee Benefit News;* p. 37(2); Aug. 1996.

(List continued on next page.)

*Primary Examiner*—Allen R. MacDonald
*Assistant Examiner*—Hani M. Kazimi
*Attorney, Agent, or Firm*—Browning Bushman

[57] ABSTRACT

A pension-based liquidity management data processing system that supports participant decision making and flexibility with respect to loans, contribution rates, and retirement spending. The system utilizes a simple index to communicate the adequacy of current or planned states in the participants separate pension account. Adequacy is determined relative to actuarial determined estimates which may be adjusted by the participant. The system is provided with safeguard yet removes artificial barriers to pension-based liquidity, loans and retiree spending, allowing each participant the maximum flexibility in optimizing his personal retirement and financial plan. The system interfaces with unsecured credit cards as a disbursement and payment mechanism, thereby preventing pension assets from directly securing credit card charges. Central processing allows multiple credit cards to compete for any participant account. The system reduces average unsecured interest rate costs without liquidating long term retirement investments by securitizing the promissory note held in the participants separate. To the extent permissible under the applicable laws, the participant may electronically elect to classify a disbursement as a periodic rather than a loan consistent with periodic spending of retirement assets to support retirement living. The present invention substantially increases the liquidity of pension accounts while providing the participant with the knowledge to protect retirement security. Through improved liquidity and related planning tools, the system enables both employers through matching contributions and employees through elective contributions to increase net contribution rates, thereby enhancing retirement security.

37 Claims, 27 Drawing Sheets

OTHER PUBLICATIONS

Zimmerman; "Investor Need To Be Aware Of Possible Bumps Along The Way"; *The Dallas Morning News;* p. 1F(2); Oct. 3, 1996.

Zimmerman; "Redefining Retirement"; *The Dallas Morning News;* p. 1F(3); Oct. 3, 1996.

Willett; "Banc One Plans To Test A 410(k) Credit Card"; *USA Today.* (undated).

Murray and O'Connell; "Banc One To Test A Credit Card Tied To 401(k)"; *The Wall Street Journal;* p. A8; June 24, 1996.

"Technology Enhances Retirement Planning For Coor's Employees"; *Employee Benefit Plan Review;* n9; p. 42(2); Mar. 1993.

"Employer Assisted Personal Financial Planning"; *The CPA Journal;* v63 n4; p. 86(3); Apr. 1993.

Snell; "Bank Of America Launches Companywide Financial Planning Education Program"; *Employee Benefits Journal;* v18 n3; p. 8(5); Sep. 1993.

Cope; "Financial Planners' Clients Are Savers", *American Banker,* v158 n180; p. 14(1); Sep. 20, 1993.

Leonard; "Financial Planning Not Just For Retirees"; *HRMagazine;* v38 n9; p. 63(2); Sep. 1993.

Warren; "Americans Are Fiscally Unfit, Despite Warnings"; *Trust & Estates;* 133 n6; p. 6(1); Jun. 1994.

Krysty and Glans; "Financial Literacy 101: A New Course In Employee Benefits"; *Pension World;* v30 n6; p. 10(6); Jun. 1994.

Ingrassia; "Planning Software Meets Market Demands"; *Best's Review—Life–Health Insurance Edition;* v95 n3; p. 74(2); Jul. 1994.

Giese; "What To Expect From A Financial Planner: You May Get Useful Advice Or A Sales Pitch, Or Both"; *Kiplinger's Personal Finance Magazine;* v48 n8; p. 73(4); Aug. 1994.

Philip; "Financial Planning Eases Complications"; *Pensions & Investments;* v22 n21; p. 17(3); Oct. 17, 1994.

Fevurly; "Throw Your Client An Adequate Safety Net"; *Best's Review—Life–Health Insurance Edition;* v95 n6; p. 74(1); Oct. 1994.

Cope; "Financial Planning Appeals To Consumers, But Price Tag Puts Them Off"; *American Banker;* v159 n242; p. 10(1); Dec. 19, 1994.

"Expenditure Patterns Of Retired And Nonretired People"; *Family Economics and Nutrition Review;* v8 n3; p. 46(3); 1995.

Rowland; "Educate—Or Litigate"; *Institutional Investor;* v29 n3; p. 87(3); Mar. 1995.

Lowder; "Search For Opportunities In The 403(b) Market"; *Best's Review—Life–Health Insurance Edition;* v96 n1; p. 64(2); May 1995.

Friedman; "Americans Better At Savings, But Will Come Up Short"; *National Underwriter Life & Health–Financial Services Edition;* n23; p. 3(1); Jun. 5, 1995.

Kapiloff; "Amex Unit Shows The Way"; *American Banker;* v160 n188; p. 15(2); Jun. 21, 1995.

King; "Principal Opens Middle Market Retail Center"; *National Underwriter Life & Health–Financial Services Edition;* n42; p. 1(2); Oct. 16, 1995.

"401(k) Loan Provisions Can Be Cause For Alarm"; *Employee Benefit News;* p. 35; Nov. 1995.

Sheley; "Help Employees Plan Now For A Secure Future"; *HRMagazine;* v40 n11; p. 88(8); Nov. 1995.

Hedges; "DOL Backs Current Investment Education Techniques"; *Employee Benefit News;* p. 37(2); Jan. 1996.

Shutan; "New Council Helps DOL Deliver Savings Message"; *Employee Benefit News;* p. 40; Jan. 1996.

"ICI Named To Develop 401(k) Clearing House"; *Employee Benefit News;* p. 42; Feb. 1996.

Johnson; "401(k) Training: A Delicate Balance"; *Training;* v33 n3; p. 58(5); Mar. 1996.

Voltz; "What Do You Mean Retirement?"; *Agency Sales Magazine;* v26 n3; p. 32(6); Mar. 1996.

"CFP Survey of Trends in Financial Planning"; National Endowment For Financial Education; the following excerpts pp. 20–22, 24–27, 33–39, 49–55; Spring 1996.

O'Connell; "Some People Use Plastic For Everything But Credit"; *The Wall Street Journal;* p. C1(2); Apr. 12, 1996.

Chesser and Moore; "The CPA–Financial Planner: Some Insights"; *The CPA Journal;* v66 n4; p. 40(4); Apr. 1996.

Junkins; "The Middle Class Needs Retirement Financial Planning"; *Employee Benefit Plan Review;* n10; p. 33(3); Apr. 1996.

Sherter; "Worker Empowerment Is The Watchword In Retirement Planning, Employers Attest"; *Employee Benefit Plan Review;* n10; p. 27(2); Apr. 1996.

Chesser, Moore and Sakarda; "Consumer Attitudes About Accountants As PFP Providers"; *Journal of Accountancy;* 181 n6; p. 52(2); Jun. 1996.

Hallerman; "Planning For Retirement"; *Home Office Computing;* v14 n7; p. 50(2); Jul. 1996.

Freidman; "Planners In 21st Century Will Face A Much Different World"; *National Underwriter Life & Health–Financial Services Edition;* n32; p. 2(2); Aug. 5, 1996.

Yip; "Banc One Credit Card To Allow 401(K) Borrowing"; *Houston Chronicle;* Jun. 25, 1996; 1 pg.

"Mistake: Missing Out On Employer Matches In Your 401(k) Plan"; *Money;* p. 120; Dec. 1996.

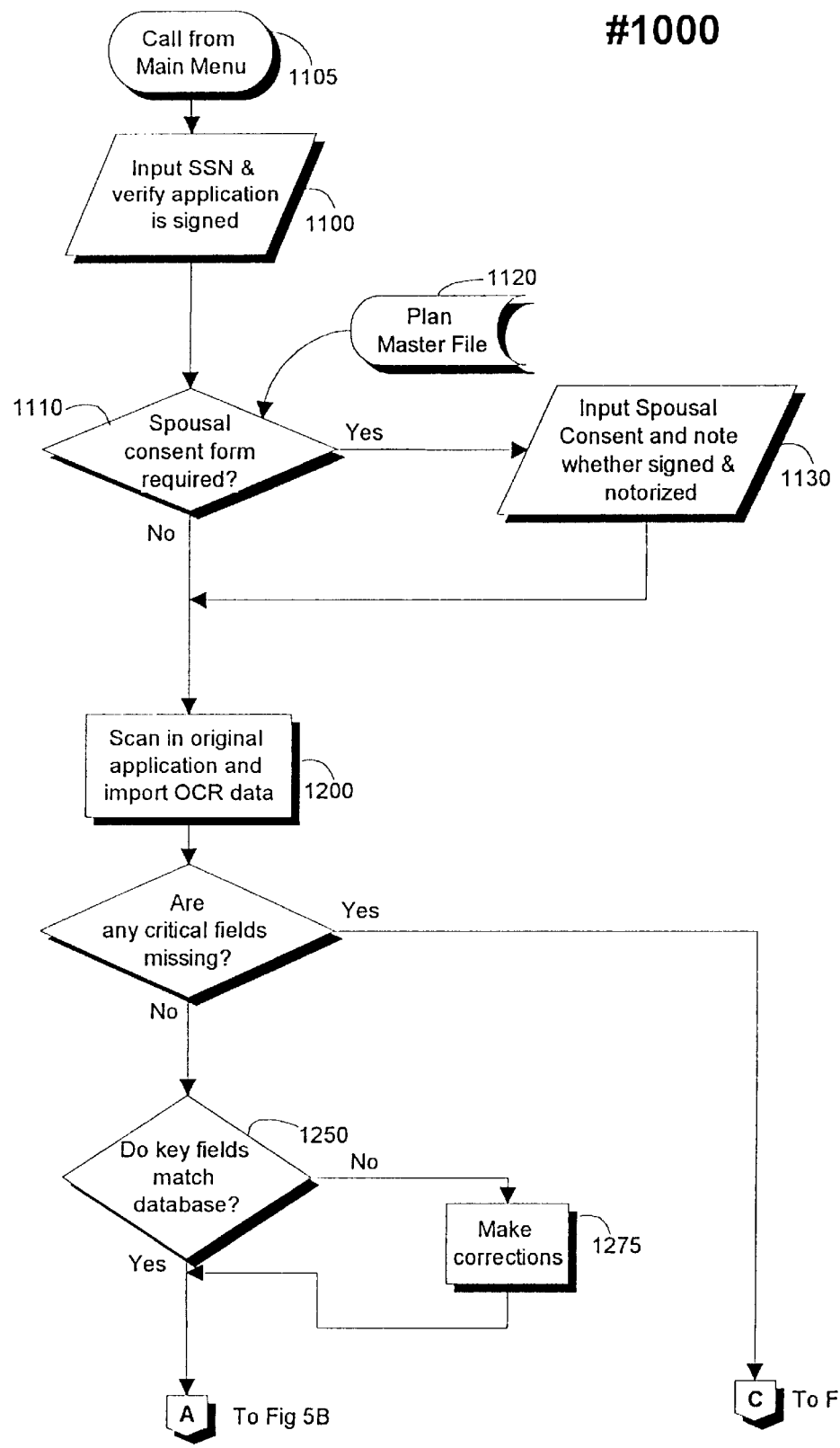

Financial Planner Process #5000

PENSION PLANNING AND LIQUIDITY MANAGEMENT SYSTEM

FIELD OF THE INVENTION

This invention relates to the liquidity and related planning systems for pensionbased assets, and specifically to processes used for pension-based participant decision making and subsequent actions with respect to loans, retirement disbursements, and contribution rates.

BACKGROUND OF THE INVENTION

Historically, retirement security was considered the responsibility of the employer or government. Defined benefit retirement plans were established providing employees a certain defined monthly benefit during retirement. Due to the number of variables involved and the extensive period of time covered before and during retirement, the cost of these plans became burdensome and costly to employers. As a result, employers have increasingly shifted since the advent of Internal Revenue Code Section 401(k) and similar retirement plans in 1981 to defined contribution plans. With the majority of defined contribution plans, it is the responsibility of the employee to electively save a portion of his or her annual salary. Some employers match or partially match the employee's contribution.

The shift from defined benefit to defined contribution has caused an enormous shift in the level of individual responsibility for retirement savings and investment decisions. Previously, all such matters were transparent to the participant. Now the individual has to both determine an adequate contribution and investment choice. Further, participants have the option of borrowing from the defined contribution account within certain regulatory limits.

The typical actuarial calculations for a defined benefit plan are performed using sophisticated computer models created by actuaries with years of training and experience. Complex calculations with numerous variables are necessary to determine an estimate of adequate employer contributions to meet retirement security requirements. Now participants are left to their own devices to determine the adequacy of contributions. Although the average participant has no such ability, this situation has persisted for over 15 years. The Department of Labor has recognized that there is a problem and is now issuing new guidelines calling for increased employer instruction and direction on retirement planning and investment choices.

Employers have also recognized that many employees are not saving sufficiently for retirement and/or are not investing appropriately to allow sufficiently high rates of return to allow contributions to grow to adequate levels. It is this recognition that partly causes many employers to discourage any form of borrowing from retirement assets. Nevertheless, most employers recognize that the availability of pension based loans increase contributions and numbers of participants. There is, however, a serious concern that large numbers of younger employees are not saving adequately for their retirement. With the acknowledged underfunding of Social Security and the expected demographic shift in the U.S. population, the ongoing national crisis is only expected to deepen.

The present invention seeks to solve these systemic problems that have existed for over a decade and a half by designing a system that properly supports an individual participant in making the correct retirement decisions without the construction of artificial liquidity barriers and restrictions imposed on all plan participants. There has been a long unaddressed need for a financial planning method and system that communicates with simplicity to the individual the effect of pension-based decisions on retirement security before, during, and after a liquidity or contribution decision is made.

Once an individual is provided adequate information to make informed retirement planning choices, there arises a need for a process and system that will allow each individual to customize and optimize their retirement choices efficiently. This will allow retirement planning to be closely aligned and optimized with non-retirement financial planning. For example, there have been several recent efforts to reduce personal interest costs by securing personal debt against assets, including U.S. Pat. No. 5,206,803 entitled "SYSTEM FOR ENHANCED MANAGEMENT OF PENSION-BACKED CREDIT." Such efforts seek to allow individuals to reduce the cost of current consumption, borrowing and related interest by utilizing the benefits of secure assets. However, such efforts fail to provide the necessary information required to allow the individual to knowledgeably monitor and control the outcome to result in improved retirement security.

The following problems continue to go unaddressed despite the efforts of the prior art to reduce interest costs through a line of credit secured against pension-based assets:

(1) Individuals need to reduce the costs of personal short term credit from rates that frequently exceed 20%, and if so, may more readily save for retirement with the increase in disposable income. Pension-based loans, generally at rates of prime plus 1%, have appeared attractive when compared to credit card debt which averages over 17%. However, pension-based loans as currently offered cause long term assets to be liquidated that would have potentially earned higher rates of return if left intact. Other efforts to solve the problem of high interest costs fail in their stated objective when the interest cost paid to the pension account is added to both the administrative cost and the opportunity cost associated with liquidated long term investments.

(2) Individuals need increased mechanisms for pension-based liquidity to optimize individual financial plans and increase contribution rates. Restrictions on pension-based loans reduce contributions as limited resources must be saved outside of the pension plan account for expected requirements prior to retirement. However, with improved access or liquidity, contributions may be optimized maximizing the tax deferral captured each year. The optimizing of retirement contributions would increase retirement security for many individuals whose current retirement savings are inadequate.

(3) Individuals need timely and understandable retirement planning information to make effective retirement related decisions. Plan sponsors and financial planners remain concerned about the impact of pension-based loans on retirement security. The concern relates to uncertainty as to whether the individual is using retirement assets for current consumption. Further, the uncertainty is a function of multiple unknown variables to the parties involved, including the adequacy of retirement contributions relative to retirements needs and age, the adequacy of rates of return on investment choices, and other individual specific factors. Not only do the plan administrators lack this information, the individual making the liquidity decision lacks much of the necessary information to make an informed decision.

(4) Employers need to have confidence that individuals have access to timely and understandable retirement planning information to fulfill fiduciary duties and thus have confidence in eliminating artificial restrictions to pension-based liquidity. Employers have eliminated financial responsibility for adequate retirement benefits and therefore have eliminated the calculations previously performed. However, this has left the individual with the responsibility for adequate contributions and investment decisions without the ability to perform the necessary calculations to determine adequacy. This problem affects both contribution and liquidity decisions.

(5) Employers need increased pension-based liquidity to increase the pension matching contribution portion of total compensation. Both employers and individuals would be better served, through reduced costs and improved asset growth, by increasing matching contributions to be more closely aligned with actuarially determined requirements. However, employers have been limited by the liquidity needs of a portion of their employee base as matching rates must be applied consistently across the employee population. Increased liquidity mechanisms could solve the problem posed by the higher liquidity needs of a portion of the employee base that needs access in the short-term to a greater portion of their compensation.

(6) Individuals need to be protected from pension-based loans becoming taxable distributions due to lack of loan portability. Many plans require pension-based loans to be repaid within a short period after termination. This frequently is not possible. In today's economy when numerous job changes are expected throughout a career, such artificially triggered taxable distributions may have a substantial detrimental effect on retirement security.

(7) Individuals need to have access to relatively short-term pension-based loans without liquidating long term investments. Liquidating long-term pension assets potentially reduces retirement security. A traditional 401(k) loan liquidates long term investments in the plan and disburses the proceeds directly to the participant in exchange for a promissory note from the participant. Repayments of interest and principal on the promissory note are credited to the participant's retirement account. However, with the growth in retirement based borrowing (conservatively estimated at $16 billion in 1995), long term retirement assets have increasingly been liquidated to fund participant's relatively short term credit needs. The liquidated assets have been replaced with relatively low yielding promissory notes. As a result, in 1995 when the S&P gained over 35%, those participants having borrowed from their assets received generally prime plus 1% (9.25%), an opportunity cost of over 20% in one year. Over the past 50 years the S&P has performed at an average of 11.8% per annum, substantially greater than prime plus 1%. Actuaries can readily demonstrate that this difference in expected return on retirement assets causes a substantial change in retirement security over time. All current pension-based loans have this effect on retirement security during a period when many do not have adequate retirement savings.

(8) Pension-based liquidity resulting from loans is currently costly, another restrictive barrier. Today, virtually all disbursements of plan loans are made by check. The leading practice in the retirement industry currently requires 12 days to process and disburse a plan loan, but only after the participant has prepared a written loan application.

(9) Retirees need to have electronic access to retirement assets for ongoing retirement spending. Current disbursement methods remain relatively unchanged from those used over twenty years ago when ERISA was adopted. Retirees would be better served by leaving assets at work in the pension plan until needed for retirement based spending.

The process and system of the present invention addresses each of the above problems utilizing a combination of existing elements and newly created elements to better serve the retirement saver. The present invention is a significant improvement over the prior art that has attempted to address some elements of the problems discussed above.

Efforts have been made to link into traditionally inaccessible lines of credit as a means to reduce consumer credit costs. This includes the approach adopted in U.S. Pat. No. 4,718,009 entitled "DEFAULT PROOF CREDIT CARD METHOD SYSTEM." This system applies credit using the cash value associated with a life insurance policy as collateral to support periodic credit needs of the policy holder. Although the system permits a flexible line of credit, the act of borrowing still is carried on in a conventional sense with a bank and/or institution, and the underlying resource is poorly utilized, thereby limiting the available savings to the consumer.

The approach adopted in U.S. Pat. No. 5,206,803 initially may appear to provide a mechanism to reduce interest costs compared to average unsecured credit cards. This system, however, still allows and in fact encourages (1) long term investments to be liquidated to provide short term credit or liquid security for short term credit, (2) credit card charges to go directly against pension assets causing retirement borrowing to be as common as putting gas in one's car, and (3) actual borrowing costs to equal or exceed the average cost of an unsecured credit card. The latter point indicates that this system will fail to achieve its desired function. After considering the opportunity cost of moving assets from average returns of 11.8% to returns as low as 6% or below in a money market fund, as well as administration costs of 3 to 4% plus additional annual fees, the participant has paid at least 9 to 10% in costs for his use of his own funds. This is over and above the prime or 8.25% paid to his own retirement account, a total effective rate of 17.25 to 18.25% per annum for the use of those borrowed dollars. This range is equal or greater than average unsecured credit card debt, causing the system to fail its stated objective to provide a low cost line of secure credit. The system disclosed in the '803 patent secures credit cards directly against pension assets in the form of a line of credit. Interest costs, when applying historical data to this system, are not properly reduced. Further, trivial spending may be charged incessantly to the card with no safeguards other than regulatory limits. Further the increased liquidity is not safeguarded by personalized retirement planning information, causing this system to compound the risks affecting retirement security.

In addition, prior art systems make no attempt to address the most substantial opportunity cost related to their proposed solutions. Prior art systems have not addressed the implications of reducing retirement security by increasing pension-based liquidity without providing the necessary information to the individuals to make informed retirement planning decisions.

As a result, there remains a long standing unaddressed need for a pension liquidity system that, while delivering on the promise of reduced interest costs, does not lose sight of retirement security. Retirement security may be enhanced if the problems of liquidity limitations, liquidity costs, individual choice, individual retirement plan optimization, informed retirement decisions, loan portability, and asset disbursement costs are adequately addressed in a pension planning and liquidity management system.

SUMMARY OF THE INVENTION

In addition to overcoming the problems associated with prior art systems as described above, key objects of the system according to the present invention are: (1) to provide a system that monitors pension-based liquidity while enabling maximum pension-based liquidity allowed within regulatory limits, and that operates in conjunction with a new or existing pension plan; and (2) to provide a system that interfaces with any new or existing prior art credit card system to efficiently distribute disbursements, information, and collect payments while allowing a variety of card companies to compete within a given plan. Further objects and advantages of this system, each related to a corresponding problem with prior art systems as previously described, are as follows:

1. Low Rates

The system provides liquidity at rates substantially lower than the average unsecured credit card, thereby providing a significant savings to the participant. The majority of credit cards charge rates of about 17%. Moreover, the participant retains a huge advantage over conventional credit card debt while keeping 100% of retirement assets working in long-term investments in the plan. As a result, the present invention does not have a hidden opportunity cost by reducing retirement asset earnings and thus damaging retirement security. The interest savings resulting from the system are real and valid, increasing disposable income and the individual's capacity to save for retirement. Individuals may easily reduce the costs of personal short term credit from rates that frequently exceed 20%, and thereby more readily save for retirement with the increase in disposable income.

2. Increased Tax Deferral

The system provides improved retirement savings by capturing greater amounts of tax deferred dollars each year. With increased liquidity under I.R.S. Section 401(k) loan programs, participants have the option of increasing contributions to the maximum allowed each year. If a $10,000 contribution is allowed each year but only $5,000 is utilized, the remainder is lost. The participant cannot contribute $15,000 the following year to make up for the unused pretax contribution. However, by contributing the $10,000 maximum and borrowing back $5,000, the participant can still capture the full tax deferral available each year. The increased liquidity utilizing this system allows individuals to optimize retirement planning even during years when limited saving dollars are available.

3. Safeguard of Informed Retirement Planning Decisions

The system provides timely and understandable retirement planning information to make effective retirement related decisions. The adequacy of retirement savings and rates are converted into a simple index which is easy to understand. This information serves as a safeguard so that the individual understands the affect of any considered pension-based loan. Also, the individual will understand whether contribution rates with investment returns will provide an adequate retirement security. The prior art fails to provide integrated retirement planning information before, during, and after pension based liquidity decisions. Current pension-based loans are commonly provided to participants without the participant or the administrator understanding the specific impact of the loan on that individuals retirement.

Plan sponsors and financial planners are concerned about the impact of pension-based loans on retirement security. The concern relates to uncertainty as to whether the individual is using retirement assets for current consumption. Further, the uncertainty is a function of multiple variables unknown to the parties involved, including adequacy of retirement contributions relative to retirement needs, age, adequacy of rates of return on investment choices, and other individual specific factors. Not only do the plan administrators lack this information, the individual making the liquidity decision lacks much of the necessary information to make an informed decision.

Coupling retirement planning with liquidity decisions is an important safeguard in the system according to the present invention. The very participants that may be running the risk of using retirement assets for current consumption may have personalized retirement data delivered to them while interacting with the loan system. Moreover, an optimal plan is presented that includes optimal contribution rates. The system objective of enhancing retirement security may thus be achieved. The system also provides a retirement planning safeguard for loans, informs eligible employees not participating in the pension plan of the effects of participation in the plan, and provides tracking spending levels for retirees.

4. Helps Fiduciary Compliance with ERISA Responsibilities

The system provides employers and other fiduciaries assurance they may fulfill their obligations to employees by providing the necessary information for individually based informed retirement planning decisions. The timely retirement planning information will allow individuals to understand what contribution rates and loan amounts will do to their retirement and, as a result, make smarter choices.

5. Matching Enabled

The system also provides increased pension-based liquidity that will allow employers to increase the pension matching contribution portion of total compensation. Both employers and individuals will be better served, through reduced costs and improved retirement asset growth, by varying matching contributions to be more closely aligned with actuarially determined requirements. Employers have previously been limited by the liquidity needs of a portion of their employee base as matching rates must be applied consistently across the employee population. Increased liquidity mechanisms may solve the problem posed by the higher liquidity needs of a portion of the employee base that require access in the short-term to a greater portion of their compensation. The bottom line is that an employer may provide an improved benefit to employees but at an overall reduced compensation cost.

6. Portability

The system provides 100% portability that will prevent pension-based loans from becoming taxable distributions due a change of jobs. Many existing plans require pension-based loans to be repaid within a short period after termination. Paying off a large lump sum frequently is not possible during a job change. In today's economy when numerous job changes are expected throughout a career, such artificially triggered taxable distributions may have substantial detrimental effects on retirement security. It is, however, not only the taxable distributions that will be prevented. A potentially much greater amount of retirement contributions never flow into pension plans as individuals know that short term funds will be needed, borrowings will occur, and then a job change will cause the amount to be taxable with penalties. As a result, contributions are curtailed, eliminated, or never started, thereby greatly damaging retirement security for large numbers of employees.

7. Securitization Protects Return on Long Term Assets

To provide access to short-term pension-based loans without liquidating long term investments, the system leaves long term investments in the plan by securitizing the promissory note on behalf of the participant. The participant's full retirement assets remains invested in long term investments uninterrupted by short term borrowing and thus is expected to earn tax deferred returns, based on historical averages, typically greater than the rate on the promissory note. Liquidating long-term pension assets potentially reduces retirement security. With the growth in retirement based borrowing, long term retirement assets have increasingly been liquidated to fund participants relatively short term credit needs. The system of the present invention completely avoids or significantly minimizes liquidating long-term pension assets, thereby allowing the assets the opportunity to achieve high rates of return.

8. Efficient Liquidity Makes Greater Contributions Possible

The system provides increased liquidity by allowing an unlimited number of pension-based loans to be originated within regulatory constraints utilizing a combination of electronic means and co-branding with independent unsecured credit card companies. Costs relating to providing and servicing secured and unsecured credit will be reduced by utilizing the integrated processes of the pension-based loan system and the existing credit card systems. As a result, participants may cost effectively optimize their own individual financial circumstance as frequently as every month or more, if required. Utilizing the unsecured associated credit card allows pension-based loans to be immediately available when needed, thereby eliminating the costly paper-based loan system. This level of access will allow participants the freedom to make the greatest contributions possible to their pension plans.

9. Convenient Retirement Spending with Safeguards

The system also provides electronic access to retirement assets for ongoing retirement spending. Prior art systems have not integrated a pre-retirement liquidity system with a post retirement liquidity system with safeguards and convenient low cost functionality. Retirement spending, the purpose of the pension account, will be serviced by the present invention without inefficient check based transfers and other disbursement accounts. The present system will thus allow retirees to buy groceries, for example, using the associated credit card, and will clear such purchases periodically against their retirement account.

Current disbursement methods remain relatively unchanged from those used over twenty years ago when ERISA was adopted. Retirees will be better served by the present system which leaves assets at work in the pension plan until needed for retirement based spending.

The system also provides an interface mechanism to combine a pension based loan administration and disbursement system with an associated unsecured credit card. The credit cards and related systems serve as the participant's spending and statementing mechanism. Importantly, pension assets are buffered from direct credit card spending with the cards not secured against pension assets. A participant may make a conscious informed decision to execute a pension-based loan to pay down the credit card or any other vendor. Otherwise current consumption spending remains on the unsecured credit card where it arguably belongs.

Many people properly view the proposed use of credit cards, in any form, with some degree of suspicion. Skeptics will wonder whether a credit card-based loan program is contrary to long-term savings. Others may attack the proposed use of the credit cards and declare that the cards will diminish retirement savings and jeopardize the well-being and security of participants. These detractors will point to an anemic national savings rate, and the dangers of consumer credit that often feed uncontrolled impulse spending. These suspicions and concerns find their roots in the paternalistic view that associates credit cards solely with consumption and retirement plans with savings and, accordingly, find an irreconcilable tension and conflict between the two concepts. Detractors may also argue that placing restrictions on a participants access to retirement savings is necessary to promote savings and to save the participant from themselves.

Unfortunately, the same barriers constructed to cause borrowing of plan assets to be impossible, inconvenient and/or costly cause participation levels in both dollars and numbers of participants to be reduced. When a substantial portion of retirement assets are funded electively by the participant, providing convenient cost effective access to a portion of plan assets at any time and with any frequency empowers the participant to increase contributions. It is widely recognized that savings rates climb significantly when plan loans are offered. The present system takes a common unsecured credit card and converts it into one of the most powerful retirement tools available to the average employee. Retirement security will thus be enhanced by an increase in contributions due to improved liquidity.

Accordingly, it is an object of the present invention to provide a data processing system for managing a plurality of credit accounts, each individually associated with a separate pension plan and a separate account within the separate pension plan.

It is a further object of the present invention to provide a method of originating an unlimited number of pension-based loans per participant without liquidating retirement assets from long term high return investments through the creation, securitization, and sale of plan held promissory notes, while further avoiding establishing a line of credit secured directly against pension assets that causes retirement assets to be liquidated and placed in low yield investments.

It is a further object of the present invention to provide an integrated loan application process that serves to support multiple electronically initiated pension-based based loans as well as support the provision of an unsecured line of credit from an associated credit card company.

It is a further object of this invention to provide a system for generating software to obtain the clearinghouse functionality which allows the combination of prior art systems with the system of the present invention to allow the features of this invention to be accomplished.

The above and other objects and features of the present invention are realized in a data processing system that provides the electronic link and clearinghouse function between multiple credit card issuers and multiple recordkeepers, the automated links with participants for loan origination, and the data retention necessary to record and account for these transactions.

In accordance with the various features of the present invention, the interest charged on the proceeds derived from the securitized promissory notes is paid to the loan administrator and securitizer of said notes. The interest need not be paid to the pension account and the original pension assets remain intact and earn the rate of return applicable to those assets.

In accordance with the various features of the present invention, requests for disbursements (i.e., non-loan proceeds) are processed by liquidating sufficient assets to satisfy the requested amount.

In accordance with one other feature of this invention, the system is responsive to the utilization of either conventional credit-type cards, debit-type cards, affinity-type cards or "smart" cards that are specially dedicated for use with the system.

These and further objects, features and advantages of the present invention will become apparent from the consideration of the drawings and ensuing description of the invention.

BRIEF DESCRIPTION OF THE DRAWINGS

FIGS. 5A–5D is a logic flowchart depicting the issuance of loan accounts;

DESCRIPTION OF THE PREFERRED EMBODIMENT

The system of the present invention accesses traditional pension plan management vehicles to securitize an unlimited number of promissory notes created between the pension plan participant's separate account and the participant, and thereby allows participants to obtain short term borrowings from their pension plan while leaving the pension assets fully invested in long term assets. The distribution of the proceeds and the repayment of the proceeds and interest are managed through an unsecured credit card account that is associated with the plan through a central clearinghouse and loan management system ("CLMS"). However, distributions may be directed to any number of participant directed accounts that are valid accounts held in the participant's name. The increased accessibility of plan assets will increase the utility of plans as saving vehicles. Inherent risks to retirement security associated with increased accessibility are mitigated through timely and understandable financial planning information provided to the participant prior, during, and after obtaining a plan loan. The system of the present invention will complete the transition of responsibility to the individual saver and provide a flexible retirement planning and monitoring system that will allow each participant to continually monitor and optimize his own customized retirement plan and financial plan.

The pension plan will be one analogous to a 401(k) plan, a 403(b) for a sheltered annuity program, or a similar account type plan constructed for the accumulation of capital assets to support future pension and/or retirement needs of the plan participant. Plans of this nature may be designed with a variety of separate embellishments. These programs are highly regulated under the Internal Revenue Code (Code) and the Employees Retirement Income Security Act (ERISA). For the purpose of the discussion herein, it is assumed that the plan provides separate accounts for the individual participants. Each of these accounts represent an accumulated level of capital that is invested in various financial vehicles, such as stocks, bonds or other assets.

Plan Sponsors and their affiliated employers adopt the system of the present invention by completing an Adoption Agreement and agreeing to adhere to the terms of certain written program documents.

Pension Plan

Figure 1:
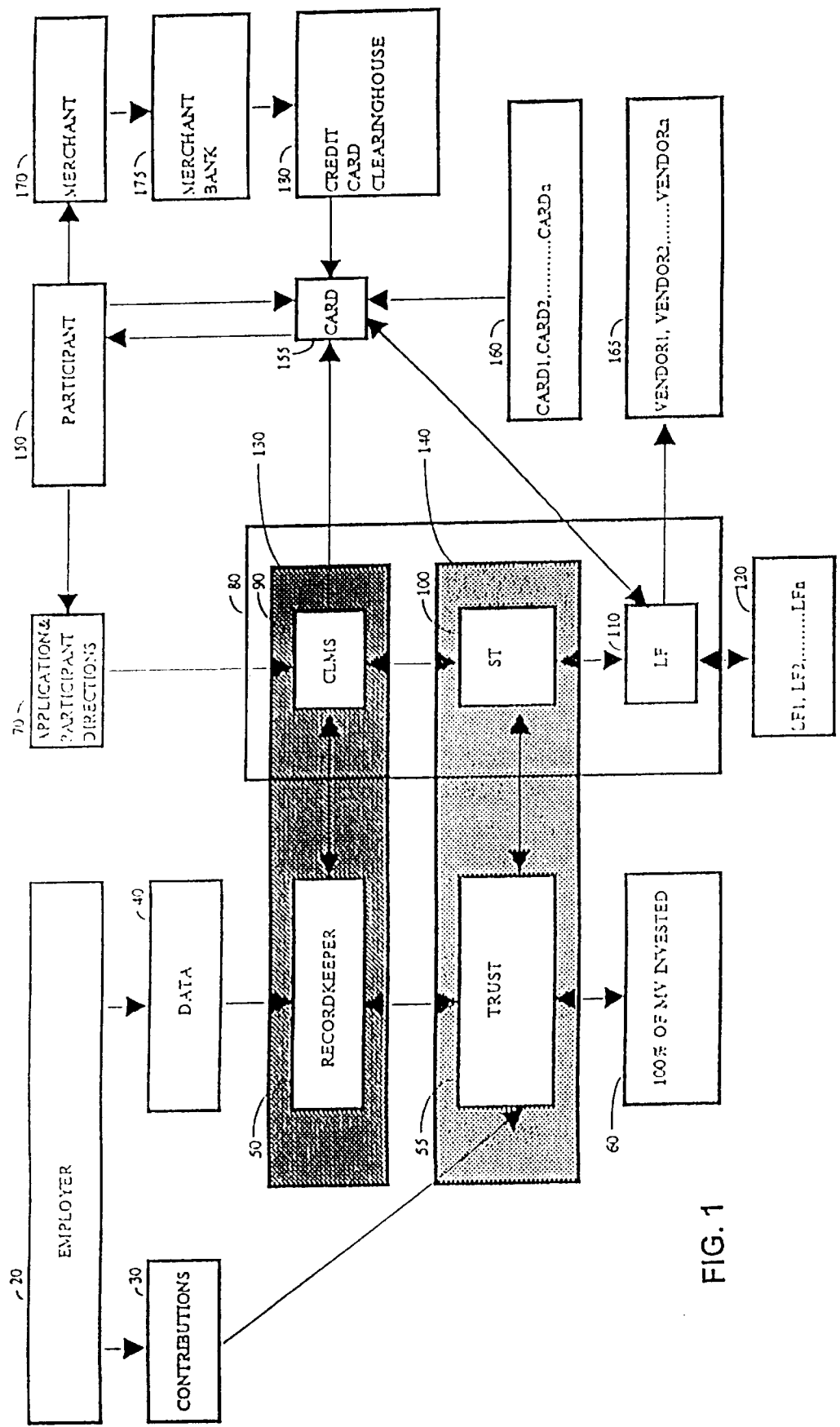
FIG. 1 depicts a flow chart relevant to the transactional information flow path associated with the present invention.

Referring now to FIG. 1, a flow diagram is presented including a plan recordkeeper 50 and a trust 55 that holds plan assets. The recordkeeper 50 receives periodic data 40 from the employer, represented by block 20, regarding contributions 30 remitted to the pension plan trust and other relevant data regarding the pension plan and the participant. The recordkeeper 50 thus maintains a record of the amount to be credited to each separate participant account. The pension plan trust 55 also receives contributions 30 from the employer which includes either employer non-elective or employee elective contributions, as well as income on investments represented by block 60. The trust 55 distributes proceeds at the direction of the recordkeeper 50 or other authorized fiduciary. Regardless of the source of contributions to the separate pension account, total assets in a plan are periodically valued at market value MV. In the preferred embodiment, the MV is determined by the recordkeeper on a daily basis, however, any suitable periodic valuation, for example four times per day, twice per week, weekly, bi-weekly, etc., may be done without departing from the scope and spirit of the present invention. All of the above activities are similar to practices currently in place.

Loans

The participant 150 has the right to borrow at any point in time (the effective date of any such loan origination referred to as the Measurement Date (MD)) under various regulatory provisions up to 50% of the MV and up to a maximum of $50,000 ("LIMITS"). The participant may continue to borrow repeatedly to the extent allowed under the loan guidelines in the specific sponsor pension plan as long as the total of all loans outstanding do not exceed the LIMITS and does not exceed the highest loan balance reached in the 12 months prior to the MD. In effect, the participant, under and within the regulations, always has a de facto line of credit being able to borrow his own funds at will subject to any restrictions imposed under specific pension plan loan guidelines. This has been a common and accepted practice in the industry since the passage of the related regulations and is also similar to activity that occurred in prior systems.

Securitization and Sale of Promissory Note

The system of the present invention allows a participant to create an unlimited number of promissory notes in a plan trust (subject to the regulations discussed above). Unlike the current practice of liquidating plan investments in the amount of the promissory note and distributing the proceeds of the liquidated investments to the participant, the promissory note itself, as an asset of the plan, is placed into a subtrust (ST) of the plan at block 100, and is securitized. The security is sold to a Loan Fund (LF) at block 110, and represents the promissory note and the right of the promissory note to call for other plan assets to be liquidated and disbursed in exchange for the promissory note. The cash received from the loan fund in exchange for the securitized promissory note is distributed to the participant's associated unsecured credit card account ("CARD") at block 155, or other vendor account ("VENDOR") at block 165, as specified by the participant.

The centralized loan management system (CLMS) is part of the recordkeeping function outsourced by the recordkeeper 50 to provide pension-based loan functions and pension-based electronic disbursement functions. Similarly, the sub-trust (ST) 100 is considered a segregated part of the trust function within a pension plan to provide trust functions with respect to pension-based loan functions and pension-based electronic disbursement functions.

Common Platform

The group of programs, hardware, and other related peripherals described in block 80 have been designed in tandem to efficiently serve under a bundled approach the participant's plurality of retirement disbursement functions, including real-time on-line financial planning process monitoring. The programs have been designed to operate on the same platform although legally comprising separate entities and ownership. Security software and continuous auditing provide the necessary underpinnings of the internal control structure.

The request(s) from the participant for the securitized promissory note loan (SPNL) is controlled through a centralized loan management system (CLMS) 90 that provides the central control over the application 70 for the loan, issuance of the requested CARD 155 line of credit, origination of the loan amounts, distribution of loan amounts, and servicing of loan balances including sourcing loan payments from the CARD. The participant completes an enrollment application 70 that requests simultaneously that a SPNL account be established and that a CARD 155 be issued from one of multiple CARD companies 160. The enrollment form captures the participants signature supporting both the revolving CARD agreement and the current SPNL request and future electronic SPNL requests. The future electronic SPNL requests will be transmitted by any conventional means, such as, but not limited to, a personnel computer, modem, the internet, telephone, or other electronic device (or through customer service in conjunction with any of the other devices) using a selected PIN number to verify identity and maintain security. Additionally, electronic disbursements from the SPNL process can only be made to the CARD or VENDOR account, blocks 155 and 165, respectively, established in the name of the participant, thereby adding another layer of security to the disbursement process.

The CLMS will create an electronic promissory note ("NOTE") in an amount comprising the amount requested by the participant plus fees, including loan origination fees, and will transfer this promissory note to the sub-trust 100. The CLMS 90 manages the status of each participants various SPNL's ensuring that all such notes are correctly amortized and serviced. The CLMS sums the equal installments required under regulations for each SPNL and determines the total minimum payment required from the participant each month. Unlike current practice where repayments typically are posted to the plan sponsor's payroll system and then deducted from gross pay, the system of the present invention in the preferred embodiment posts all required minimum payments to the CARD 155, and collects a net wire disbursement from the CARD company to the LF 110. The CLMS posts the payment to the CLMS database, the ST database, and the LF database. Further, the CLMS directs the wired cash funds to the applicable LF. To the extent the interest spread between the interest rate charged by the LF and the interest rate charged to the participant by the CLMS is not collected in advance through origination fees, a portion of the interest collected will be retained by the CLMS to cover administrative expenses.

Subtrust

The ST is a legally enforceable trust established upon the adoption of the loan program to serve the participant's loan requests and is considered part of the pension plan. The ST is a third party directed trustee accepting specific written duties and responsibilities to execute transactions pursuant to a secure database and a preestablished set of programs. The secure database and set of programs establish, maintain, and update data files representing a plurality of ST accounts, one for each sponsor pension plan, and a plurality of separate participant accounts within each ST account. The CLMS transfers the NOTE to the applicable ST account with instructions from the participant to (1) securitize and sell the note in one of a plurality of LFs' indicated by block 120, and (2) remit the cash proceeds to a CARD account or VENDOR accounts at blocks 155 and 165, respectively. The ST places the NOTE in the separate account of the participant and creates an electronic security representing the note ("SECURITY") and transfers the SECURITY to the directed LF, block 110. The LF accepts the SECURITY as one of a pool of eligible receivables and accepts the STs' instructions regarding disbursement of funds. The cash is disbursed net within a reasonable administrative period, e.g., at the end of each day or week, depending on processing volumes, to the CARD or VENDOR company, blocks 155 and 165, respectively, with the required detail information to allow each loan disbursement to be credited to the correct account.

Credit Card Disbursement Front-End

The participant, indicated by block 150, uses the CARD 155 for any merchant 170 that accepts the given card brand. The processing of the credit transaction through the card network from the merchant 170 to the merchant bank 175, and the clearing of the charge 180 to the issuing bank or to the CARD 155, represents the traditional credit card process currently in effect as industry standard for VISA or MasterCard, although the linkage to proprietary networks such as Discovery or American Express is equally applicable. It is to be understood by those skilled in the art that any type of payment card may be used in the payment system without departing from the scope and spirit of the invention. The electronic payment process, before association with the blocks 70 through 120, is also similar to existing technology and is common industry practice. The system of the present invention includes the new use of the unsecured credit electronic payment process to pre-disburse pension disbursements, combining the unsecured electronic payment processing system with pension-based accounts for the first time. Further, the CLMS allows any card from any vendor to be linked to any participant in any pension plan which offers a level of protection to the participant through competition between card vendors. Additionally, the linkage provides the employer and participant with an important financial planning tool to, through improved liquidity, increase confidence to increase contributions to the pension plan as well as to decrease interest costs on existing debt without liquidating plan investments. Upon payment of principle and interest in full to the LF, the SECURITY is returned to the ST who in turn places the NOTE in a repurchased history file.

In the event that default occurs through participant non-payment of minimum purchases on the CARD and no arrangement is made between the participant and the CARD for the CARD to continue accepting minimum SPNL payments charged to the CARD by the CLMS, a default process will be initiated. The participant may be notified by telephone or correspondence of the financial planning consequences of such default. If the participant fails to respond or rectify the default, the participant may be contacted by a financial planner for financial planning counseling. The financial planner will include, but not limited to, one or more of the following: in-house counseling staff, contracted independent financial planners, or other consumer credit counseling organization. In this manner, pension plan sponsors will be providing another benefit to their employees where currently such credit counseling is not commonly provided. However, if the participant is non-responsive to the financial planning counseling efforts and the default is not corrected within the periods allowed by the Internal Revenue Service, the entire SPNL balances will be considered a taxable distribution and the CLMS will generate a 1099 tax document and mail to the participant, direct the ST to liquidate necessary assets in the trust to repurchase SECURITY, distribute proceeds to the LF in exchange for SECURITY, and file the NOTE in the default repurchased history file.

Those SPNL transactions which have been completed but which may need to be later referred to are archived onto a floppy disk, magnetic tape or other off-line storage. It is to be understood by those skilled in the art that information may be periodically transferred from the hard disk to any off-line storage medium so that the hard disk is not entirely filled.

System Monitor

Figure 2:
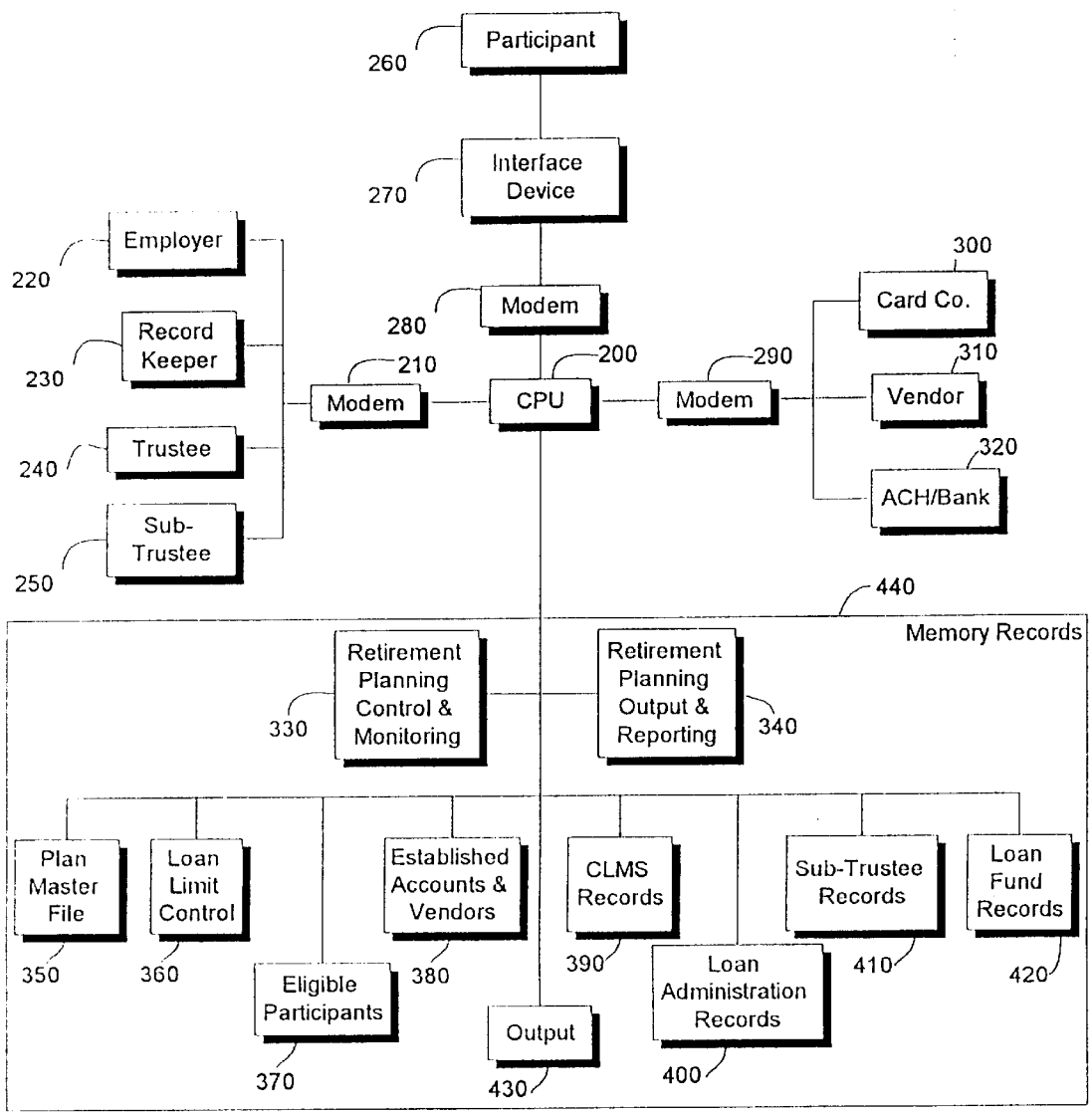
FIG. 2 depicts in block diagram format the functional blocks associated with the system monitor or CLMS of the present invention.

Referring now to FIG. 2, a functional block diagram for the system monitor is provided. The system monitor, the CLMS, is controlled by a central processing unit (CPU) 200, having stored program commands and instructions governing it's processing responsibilities. The CLMS preferably is a relational information database and a centralized computer. In a preferred embodiment, a SUN WORKSTATION is used, however, it is to be understood by those skilled in the art that any compatible computer system may be used without departing from the scope and the spirit of the invention. The monitoring system can also incorporate a number of personal computers (not shown) which act as support systems to the centralized system.

On the input side, the CPU is in communication via modem 210 with the pension plan administrator or record-keeper 230, the employer 220, the trustee 240, and the sub-trustee 250. A preferred embodiment reduces transfers of data with the employer to zero with records updated through communication predominantly with the plan record-keeper 230. However, alternative embodiments allow for direct communication with the employer. Likewise, the communication with the trustee is maintained at a low level, predominantly for retirement spending disbursements, with trustee services predominantly provided by the sub-trustee ST for loan related transactions. A preferred embodiment utilizes modem devices connected to the internet with data encrypted for security, utilizing encryption techniques the same or similar to the SET standard recently adopted by Visa and MasterCard for credit card transactions. Additional input is provided by the credit card company 300 regarding minimum payments and the unsecured credit line status through a modem 290. When modems are referred to, it is to be understood by those skilled in the art that any type of communications device may be used in the liquidity system, including but not limited to floppy diskettes, cartridges, mail, and nine track tape reel, without departing from the scope and spirit of the invention. An alternative embodiment would include a terminal directly linked to the CPU over a LAN or WAN network that eliminates the requirement for a modem and/or encryption.

The dominant form of input to the liquidity management system is the interaction and direction from the participant 260. The participant uses an interface device 270 and a modem 280 to provide both input and receive output from the CPU 200. When interface devices are referred to, it is to be understood by those skilled in the art that any type of communications device may be used in the liquidity system including but not limited to telephone, interactive voice response systems, internet, interactive television, personal computer, and/or ATM, without departing from the scope and spirit of the invention.

The participant directs the CPU to determine authorized loan amounts and originate loans. Further, the participant prior, during, or after the loan establishment process interacts with the Retirement Planning Control and Monitoring software 330 to display the effect of retirement based borrowings on retirement security at output and reporting block 340. The provision of this timely feedback to effect the participants decision is an important feature of the liquidity management system. Historically, timely information has not been readily available regarding retirement security during the pension based liquidity decision making process. Although participants have been struggling with such decisions over the last 15 years, a problem has remained unaddressed. Further, the system monitoring of retirement security continues after a liquidity decision has been made and executed. Among numerous reporting capabilities, the system continues to generate retirement planning reports 430 that will periodically encourage the participant to increase contributions and modify liquidity behavior.

After the participant has had the opportunity to incorporate the projected retirement security index into his liquidity decision, the CPU obtains various stored data used to originate loans and/or make retirement disbursements. The plan master file 350, loan limit control file 360, and eligible participants file 370, are all used to establish an accounts and vendors file 380. The CPU obtains data periodically, daily, weekly and/or monthly, from the plan administrator/recordkeeper 230 and updates the appropriate file accordingly. In an alternative embodiment, the CPU contacts the plan administrators database via modem during a loan request and obtains the most recently available vested account balance.

The CPU 200 in response to participant requests establishes loan accounts with adjoining vendor accounts that are authorized to receive system disbursements. The CPU records loan origination and servicing transactions in the accounting records of the separate entities involved in the transaction, namely the Clearinghouse Loan Management System Records 390, the Loan Administrator Records 400, the Sub-trustee Records 410, and the Loan Fund Records 420. All the blocks 330 through 430 are considered memory records, block 440, and are called upon as inputs by the CPU depending on the nature of the participant requested transaction. Conversely, as participant requested transactions are completed, the CPU updates the related memory records and stores the updated records in the appropriate database residing on storage medium. In general, when memory record storage devices are referred to, it is to be understood by those skilled in the art that any type of storage device can be used without departing from the scope and spirit of this invention including but not limited to RAM, ROM, DASD, data archiving, data warehousing, and data back-up storage devices.

Outputs 430 may include various management reports, including periodic account reporting to the participant, regulatory reporting, audit reporting, and pension plan based reporting. Additionally, statistical reports indicating the trend in savings by plan and by all customers may be produced to track the effectiveness of retirement planning communications. Another form of CPU output may be disbursements directed to card companies 300, authorized vendors 310, and banks through ACH 320. An alternative embodiment would allow participants to write checks that would clear through the associated credit card company or a correspondent bank account. Disbursement data may be transmitted through a modem 290 with cash distributed through wire transfers. Card companies will also receive minimum payment requests from the CPU through modems 290.

The hardware configuration as shown in FIG. 2 allows a plurality of card companies to compete for participants within a single plan providing competitive benefits to participants. Additionally, the structure of the system buffers pension assets from small expenditures that should more appropriately be managed on an unsecured credit card. Lastly, the system includes retirement planning as an important monitoring control that continues to educate self directed participants to make optimal retirement security decisions.

Main Menu

Figure 3:
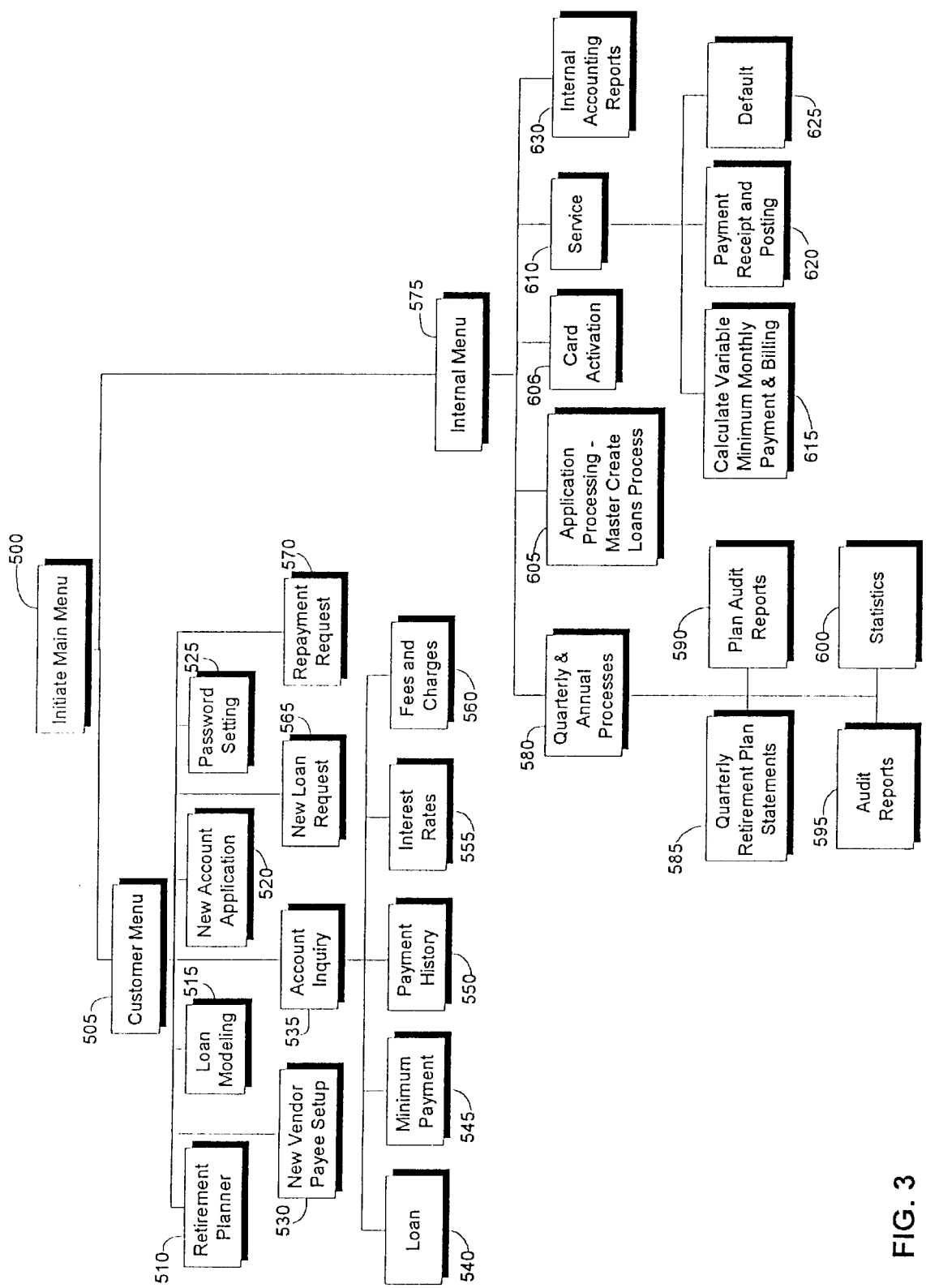
FIG. 3 depicts in block diagram format the system main menu depicting the basic functionality of the various subroutines.

Referring now to FIG. 3, the system main menu is depicted in block diagram format providing an overview of the systems functionality. The Main Menu is the main system entry point for participants at block 525 and for internal personnel at block 575. Additionally, upon completion of processing, most programs in the CLMS return to the Main Menu pending further user instructions. The participants may be using any interface device, such as but not limited to telephone and personal computer. The participant may directly access the Retirement Planner 510 to determine current or planned levels of retirement security. Additionally, Loan Modeling at block 515 may be performed to determine estimated minimum payments for planned loan amounts, terms, and interest rates. The customer may request a Loan Application at block 520, or complete an on-line form. Password setting at block 525 allows a participant to establish a password and/or personal identification number (PIN) to enable future electronic transactions. New Vendor Setup at block 530 allows the participant to change, add, or delete vendors established as approved payees for electronic disbursements. Account Inquiry at blocks 535 through 560 allows a full range of participant queries regarding the status of transactions that have occurred with respect to his account, including but not limited to loan balance, required minimum payments and past due amounts, payment history, interest rates, and other fees charged to his account. Once a liquidity account has been established, new loan requests may be electronically initiated at block 565 in conjunction with the PIN. Conversely, also in conjunction with the PIN, additional repayments may be electronically initiated at block 570 to repay existing pension plan loan balances in the liquidity account.

The Internal Menu 575 provides access to CLMS personnel for typically internal batch processes. Quarterly and annual processes 580 include printing of quarterly retirement plan statements 585, where loan balances and performance relative to planning objectives are updated. Plan audit reports 590 are prepared to satisfy reporting requirements for each plan's annual financial statements. Audit reports 595 prepare schedules and samples in support of the requirements designed by the CLMS' external auditors to satisfy the requirements under SAS #70. Statistics 600 track loan and contribution levels by participant and by plan to monitor the effectiveness of retirement planning education provided to participants. Application Processing 605 allows the input of applications data for the establishment of liquidity accounts and the creation of related pension-based loans, if any, and includes the sub processes of issuance, authorization, and origination. Card Activation block 606 completes the issuance process by receiving data from the card company and storing such data in association with the pension-based account. Service block 610 provides for the ongoing servicing of an existing pension-based loan balance, including billing for minimum payments, payment receipt and posting, and default or collection processing. Finally, internal accounting reports 630 are produced at least monthly for the CLMS.

The flowcharts in this specification provide a detailed explanation which will allow a programmer of ordinary skill to program routines contemplated by the present invention without undue effort or creativity.

Creation of Pension-Based Loans

Figure 4:
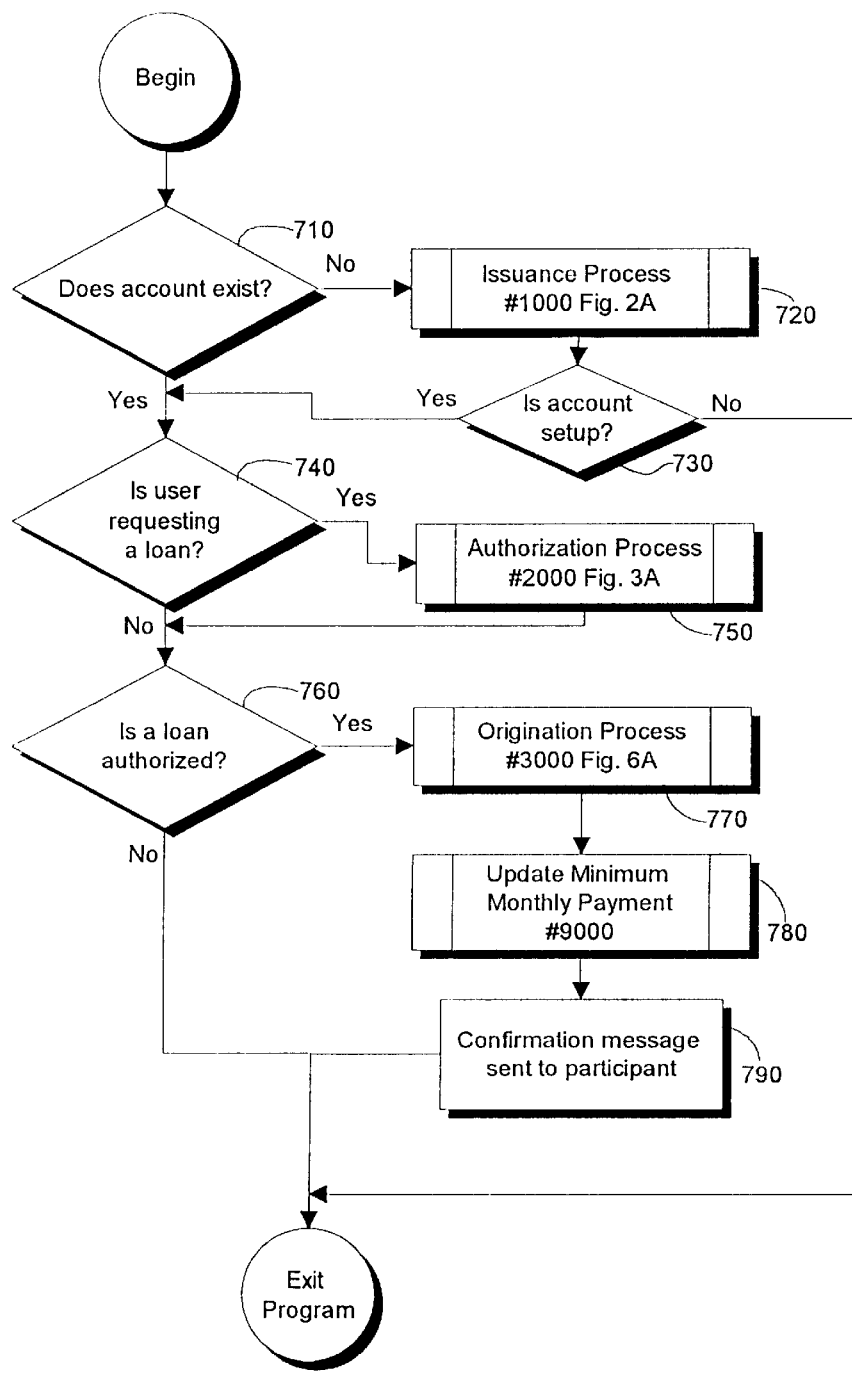
FIG. 4 is a logic flowchart of suitable software that controls the subroutines which create pension-based loans.

Referring now to FIG. 4, a logic flowchart depicts a software routine that controls the subroutines that control the creation of pension-based loans. A loan request occurs through the receipt of a signed application or the request for a loan from an account holder. Block 710 verifies whether an account already exists for the participant. If not, the routine calls the Issuance subroutine 720. Upon returning from the issuance subroutine, a test is applied at block 730 to determine if an account has been established. If not, the routine ends processing. If an account has been established, a test 740 is performed to determine if a user is requesting a loan. If the user is requesting a loan, the Authorization subroutine is called, block 750. If the user is not requesting a loan or the Authorization routine has returned control to the master process, a test 760 is performed to determine if there is an authorized loan pending. If not, the program completes processing. If there is an authorized loan pending, the Origination subroutine process is called, block 770. Upon completion of the Origination subroutine, the Update Minimum Monthly Payment Subroutine is executed at block 780. The final subroutine 790 executes a confirmation to notify the participant by, including but not limited to, letter, e-mail, or CARD statement, that a transaction has been completed per his request.

Loan Account Issuance

Referring now to FIG. 5A, a logic flowchart depicts the issuance of loan accounts. An application for a credit card loan account is received at block 1105, and time/date stamped. In block 1100, the Social Security number on the application is keyed and verification is made that application is signed by the applicant. Block 1110 determines by reference to the plan master file database 1120 whether spousal consent forms are required. If so, the processor verifies the spousal consent form has been sent in, properly signed and properly notarized. The applications and any necessary spousal consent forms are scanned at block 1200 with character recognition software to convert the scanned image to machine readable data. The application includes but is not limited to vendor names and account numbers that the applicant wishes to electronically pay, credit card account numbers and balances to be paid down currently or in the future, and a selection of an associated credit card from options provided on the application. If the applicant has not selected a specific card, the application assigns the participant to a default card company specified in the application agreement that was signed. In addition, the application includes information stipulated by the associated credit card company required to process and authorize an unsecured line of credit. Key fields from the scanned and converted data from block 1200 are compared at block 1250 to the applicant's data in the CLMS. Note that a preferred embodiment does not preclude manually keying all data from the application or utilizing another method of inputting the application data into the CLMS system. If any key fields are missing, such as but not limited to, signature, spousal consent form existence, signature, and/or notarization as determined at block 1210, the application is put on hold at block 1500, with notification sent to the applicant. To the extent key fields such as, but not limited to Social Security number, name, and address do not match the database, personnel reviews the non-matching data and performs corrections at block 1275 to the extent errors relate to the character recognition and scanning process.

Figure 5B:
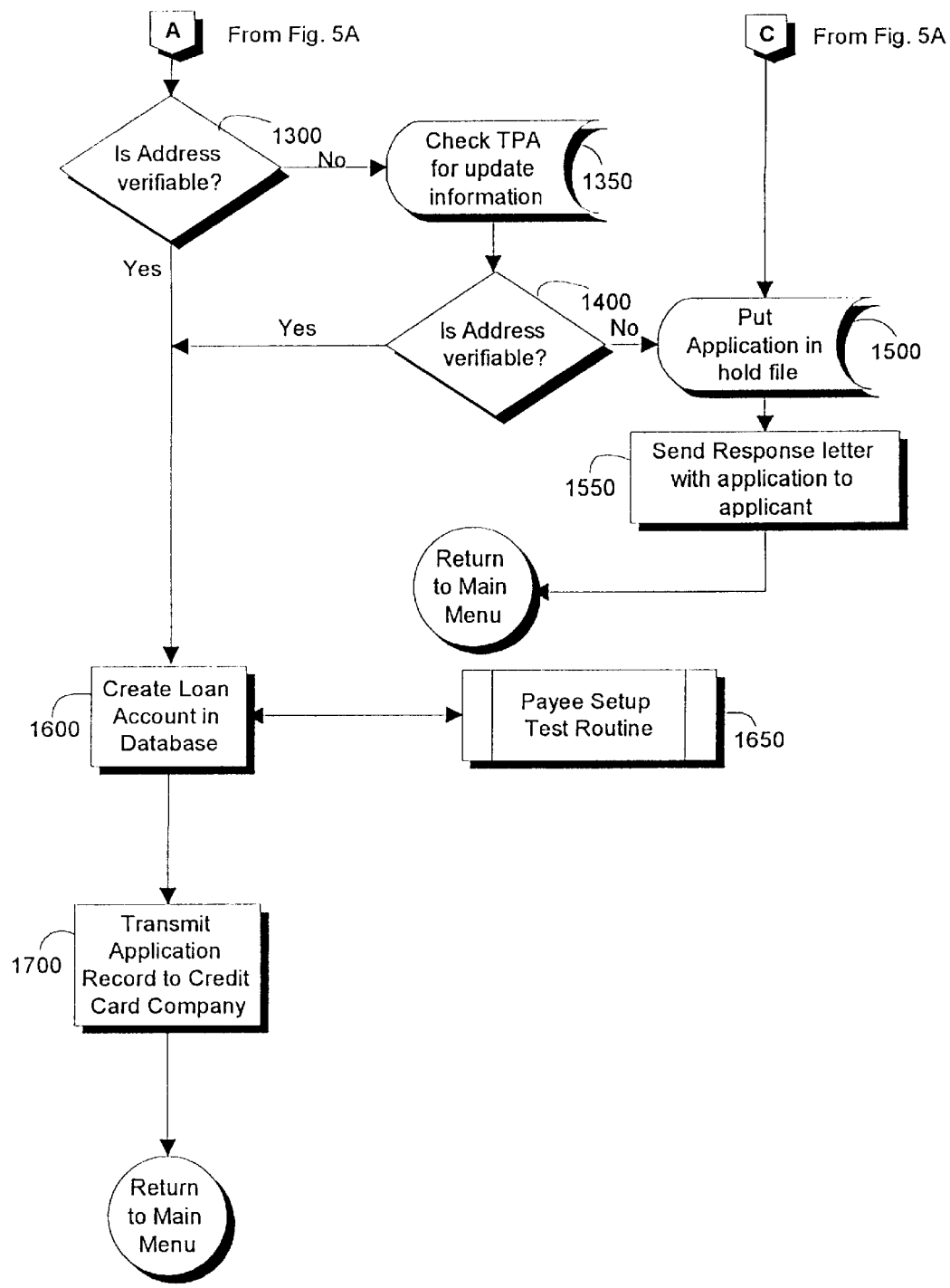

Referring now to FIG. 5B, a logic flowchart continues the depiction of the issuance of loan accounts. If the address still does not match at block 1300, the TPA is queried at block 1350 for an updated address. If the address still does not match, the application record is placed in a hold file 1500, and the applicant is sent a response letter with the application indicating that the address does not match the TPA's database records and to correct the TPA's database records, then resubmit the application. Given that all key fields have been entered and verified, a loan account is established at block 1600 with all requested payee fields forwarded to a Payee Setup Test Routine 1650. This routine controls the sending of zero value test messages through the ACH system to verify the vendor data has been established correctly in the system for future payments (including follow through if the test messages fail). As a final step in the Issuance Subroutine, an application record is transmitted at block 1700 to the selected credit card company for the card company to perform credit scoring and other related procedures to issue applicant an unsecured line of credit, and prepare and mail the physical credit card.

Credit Card Activation

Figure 5C:
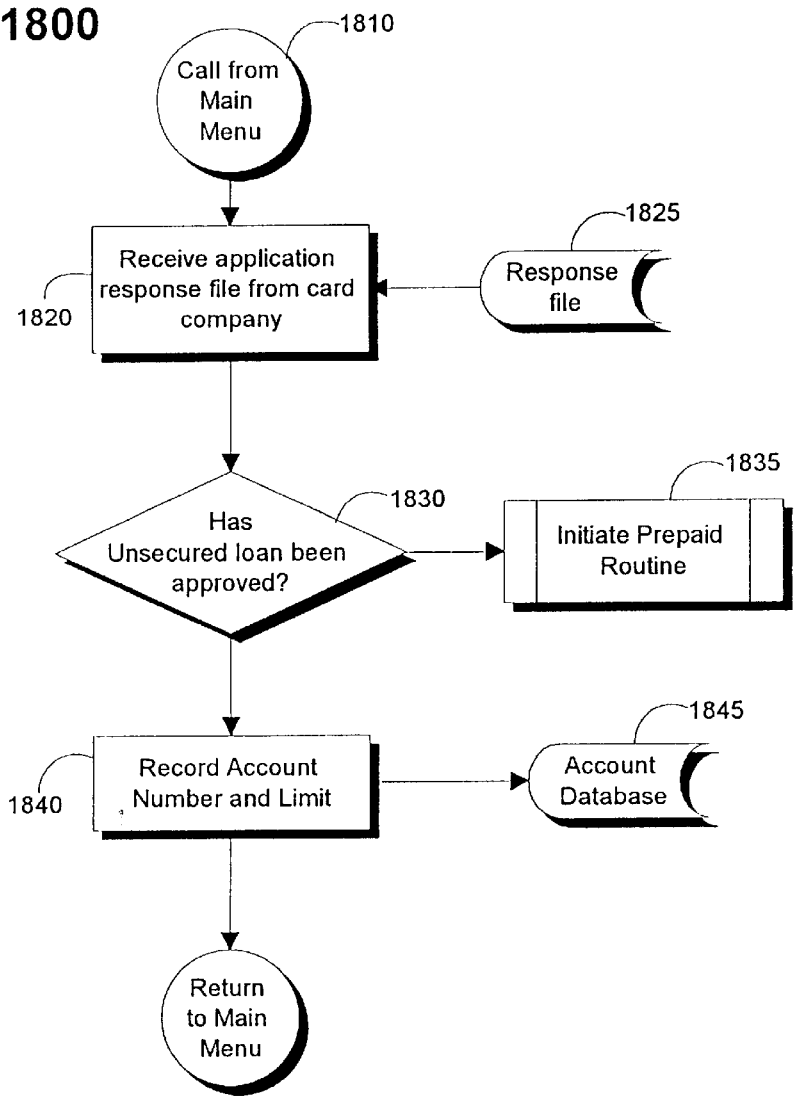

Referring now to FIG. 5C, a logic flowchart depicts the completion of the issuance of a loan accounts where a response has been received from the associated CARD company at block 1825. The response file is input into the CLMS system 1820. A test is performed at block 1830 to determine if an unsecured loan has been approved. If not, a Prepaid Subroutine 1835 is called which, based on participants instructions, initiates the origination of a pension-based loan to fund a prepaid debit card to meet the requested line of credit limits. If the unsecured line has been approved, the CARD account number and limit is recorded at block 1845 in the participants loans account file.

Figure 5D:
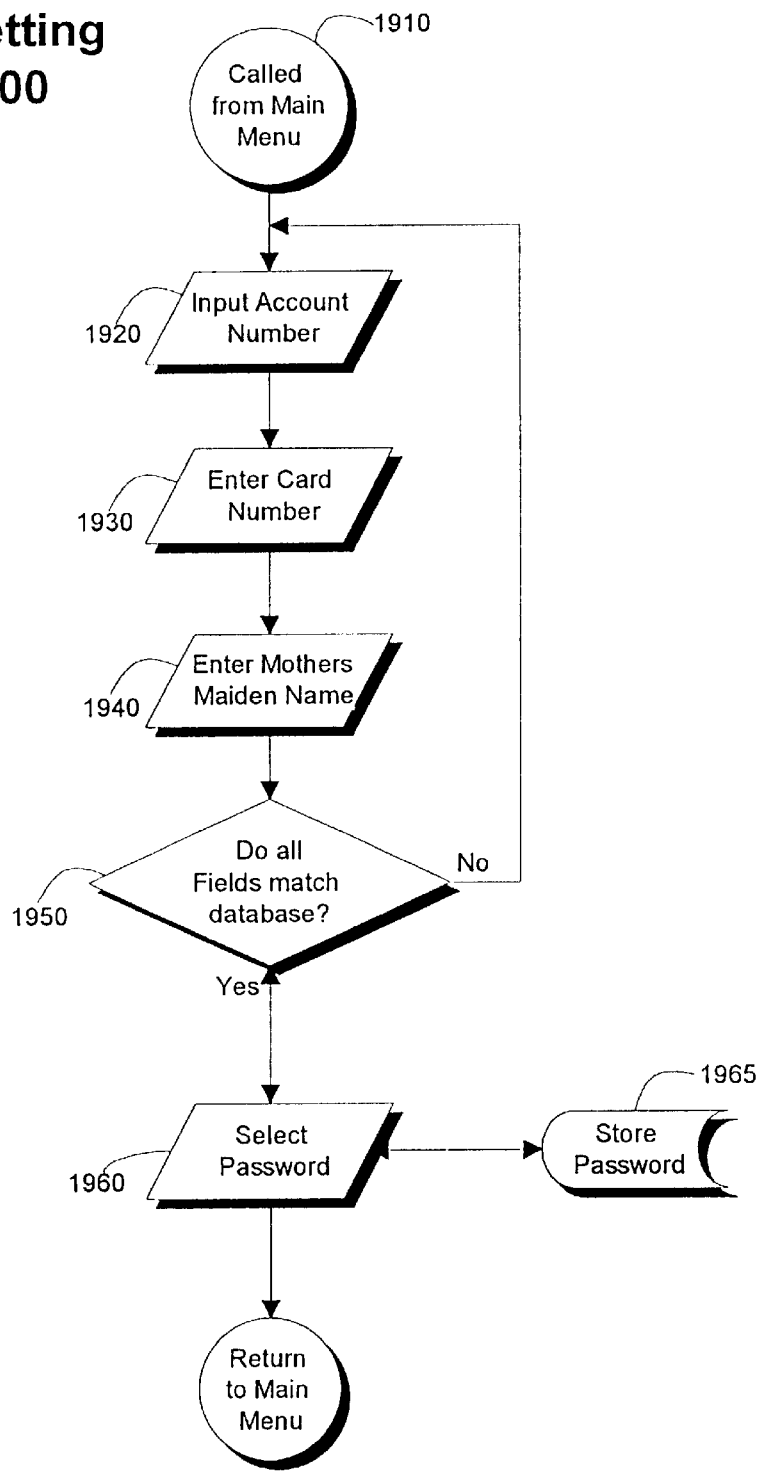

FIG. 5D illustrates the final phase of the loan issuance process, namely the loan activation and password sorting operation. The participant initiates the process from the Main Menu, block 1910. Three data fields are entered in a preferred embodiment, the liquidity account number, the card number, and the participant's mothers maiden name, blocks 1920 through 1940. The data input is matched to the data base records, block 1950, to verify that the participant has provided adequate identification prior to getting access to the password setting function. The participant sets the password at block 1960 and the password is stored at block 1965 in a secure database. The process now complete, returns to the Main Menu.

Loan Authorization

Figure 6A:
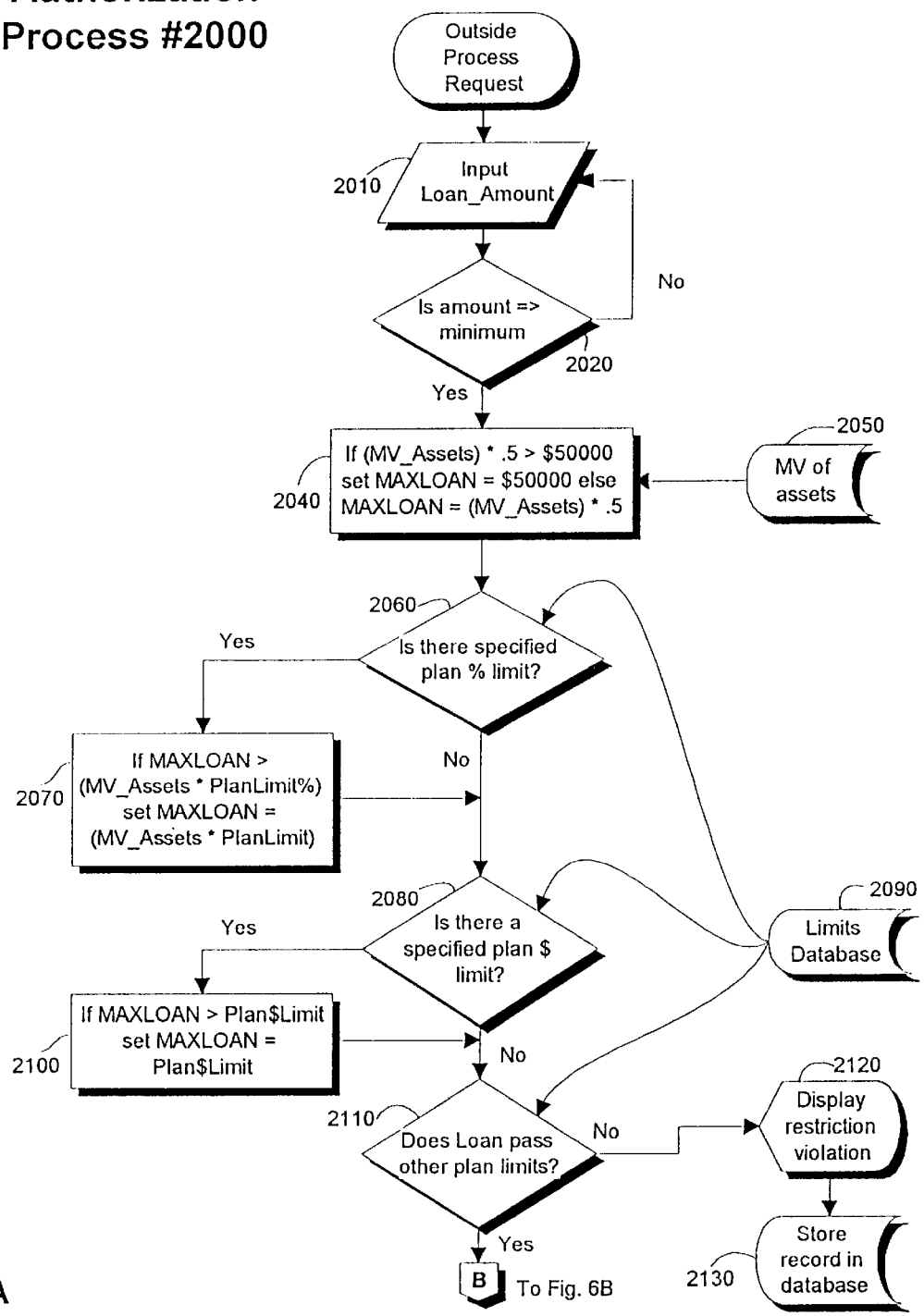
FIGS. 6A–6D is a logic flowchart depicting the authorization of loan amounts.

Referring now to FIG. 6A, a logic flowchart depicts the authorization of loan amounts. It is assumed that a new loan has been requested by a participant with a loan account established in the CLMS at block 2010. A check is made at block 2020 to ensure that the loan amount must be greater than specified minimum, as determined by the plan or by the Loan Administrator. The vested market value of the participants plan assets are obtained at block 2050, which is updated periodically in the CLMS and/or obtained by on-line query to the TPA from the CLMS. The CLMS will obtain the vested MV from the plan sponsor or recordkeeper in any conventional manner such as, but not limited to, telephone, interactive voice response systems, periodic tape transfer, diskette, modem, on-line look-up, or electronic data interchange. The Department of Labor and Internal Revenue Service loan limits are applied in block 2040 to determine the initial value for a temporary variable MAXLOAN. In block 2060, plan specified limits are checked to determine if the plan has imposed more restrictive limits than the regulatory bodies. If so, the temporary variable MAXLOAN is reset to the lower plan limit at block 2070. Similarly, in block 2080, if there is a limit expressed in total dollars and the total is less than the other limited amounts, MAXLOAN is reset at the lower level. Any other non-numerical plan limits or participant specific limits are checked in block 2110 to determine if the plan account has any other restrictive characteristics that would prevent a plan loan being authorized. For example, if a plan determined loans would not be available to former employees, these tests would check the employees active status and determine if currently employed by the plan sponsor. Another example would involve S corporation plan sponsors where a 2% or greater stockholder would be precluded from obtaining a loan. Any such limitation would cause the restriction to be displayed to the participant at block 2120, preferably online through but not limited to, telephone, IVR, internet, or in batch mode through printed and mailed correspondence or e-mail. The loan request and limitation applied is stored in block 2130 for later reference and participant inquiry.

Figure 6B:
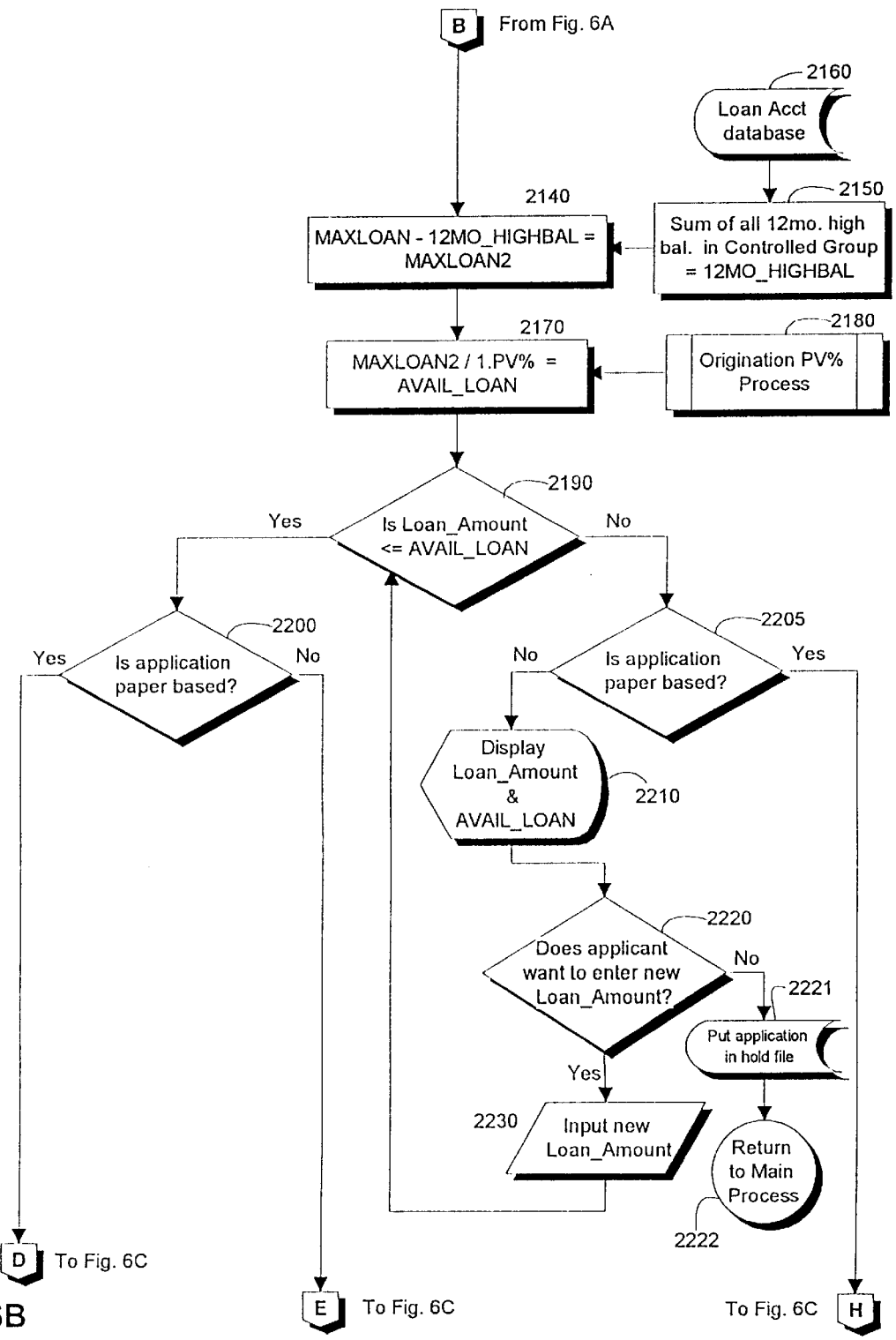

Referring now to FIG. 6B, a logic flowchart continues to depict the authorization of loan amounts. After regulatory limits and plan limits have been applied, a previous loan balance limitation is applied. The loan account database 2160 is accessed to determine the highest loan balance in the past 12 months for all loans in a controlled group of plans at block 2150. The sum of these highest loan balances reduces the MAXLOAN to a new temporary variable amount MAXLOAN2 at block 2140.

In a preferred embodiment, a final limitation is applied to determine the loan amount available to the participant. Origination fees are charged on the front-end of a loan origination process. This approach to the combined 401(k) and credit card loan process allows the APR costs of borrowing to be held down by matching the front-loaded costs of borrowing with revenue generated by such activity. Consequently, the present value of the interest spread between the rate charged to the participant and the rate charged by the Loan Fund at block 2180 is used to reduce MAXLOAN2 to the available loan balance at block 2170. The Origination PV % routine in block 2180 is explained in detail at FIG. 7. Alternate embodiments would have (1) no up-front origination fees charged with or without an increase in APR, (2) a partial origination fee based on some portion of the interest spread, and/or (3) a back-end loaded fee for repayment before a given date.

The requested loan amount is approved at block 2190 if less than the available loan amount. Blocks 2200 and 2205 determine if the request for authorization is resulting from an on-line query or paper based application. If the requested loan amount has not been authorized and the participant is on-line, the participant has the available loan amount displayed to him at block 2210. The participant is given the option of requesting a loan amount up to the available loan amount in block 2230. If the participant elects not to select a new loan amount in block 2220, the application record is placed in a hold file 2221, and the subroutine returns to the main process via block 2222.

Figure 6C:
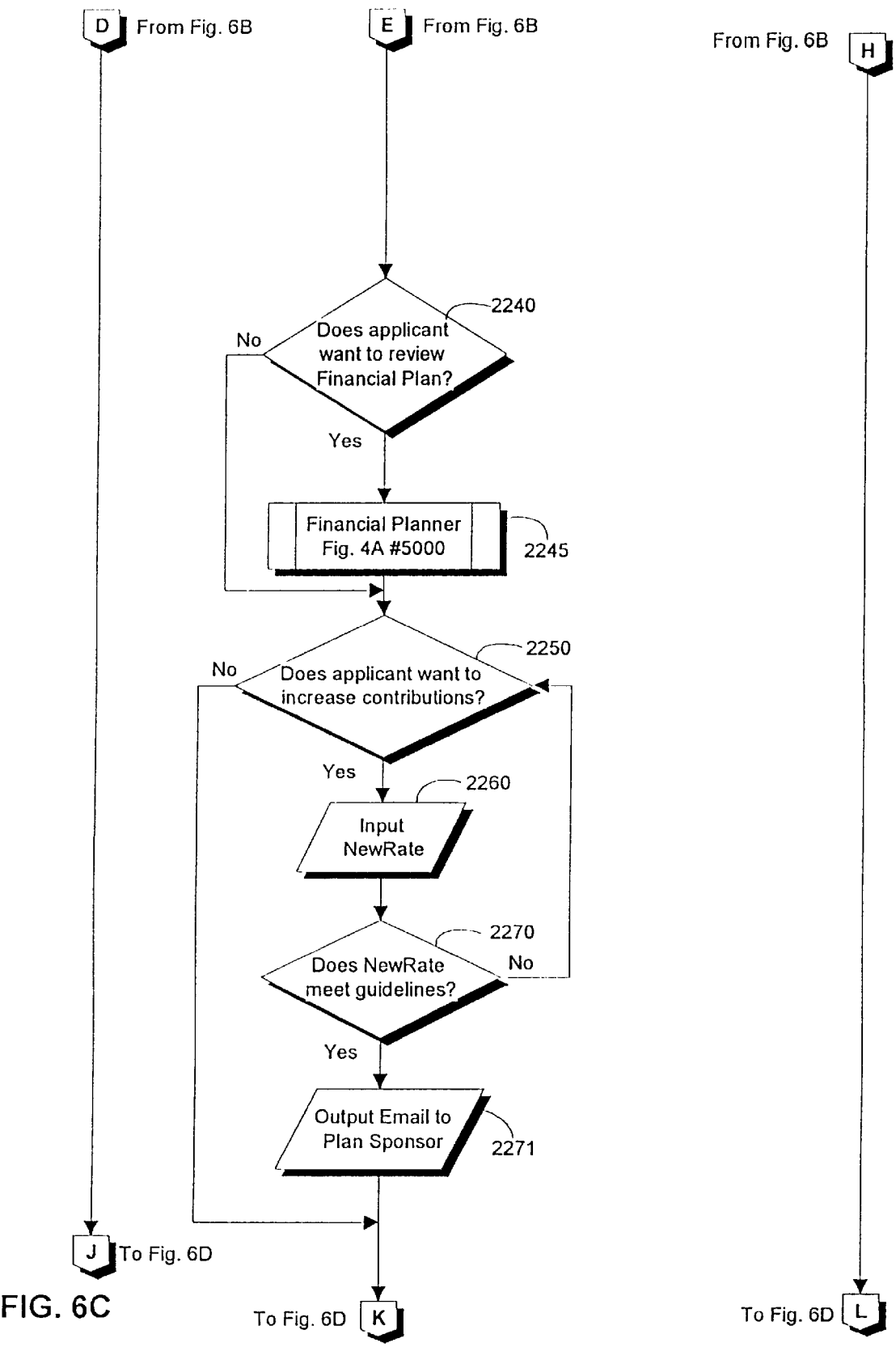

Referring now to FIG. 6C, a logic flowchart continues to depict the authorization of loan amounts. If an authorized loan amount is selected, the participant is given the option to review his retirement plan at block 2240. Prior art systems would conventionally originate a loan at the determination equivalent to the MAXLOAN2 determination at block 2140 at FIG. 6B. The system of the present invention provides a retirement planning routine as an additional control to protect participants from inadvertently damaging their retirement security. The detail of the retirement planning control will be discussed in FIG. 8 below. In addition to providing essential information on the adequacy of retirement savings and the impact of the proposed loan, the participant may also be provided information that will show what the optimal contribution rate should be. As a result, the participant may request that his contribution rate be increased at input blocks 2250, 2260 and 2270, with email being sent directly at block 2271 to the plan sponsors designated representative.

Figure 6D:
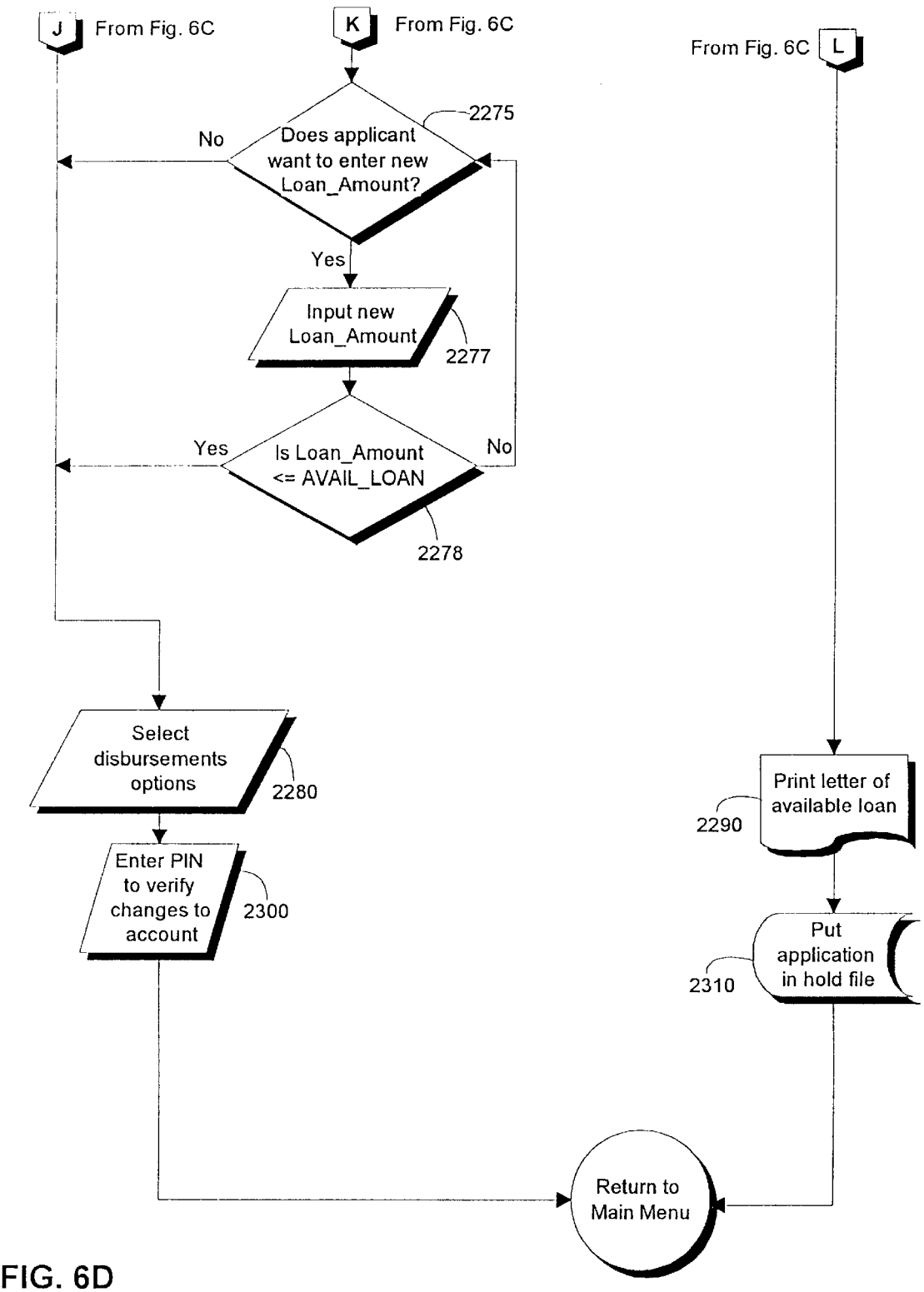

Referring now to FIG. 6D, a logic flowchart continues to depict the authorization of loan amounts. After considering the retirement planning consequences and considering increasing the contribution rate, the participant may forego obtaining a plan based loan, change the amount of the loan request, or proceed with the loan, based on options provided in blocks 2275 and 2277. Assuming that the participant determines to proceed with a loan, and that the loan amount is approved and verified at block 2278, the participant selects which of the approved vendors the disbursement should be directed to, with the default going to the associated credit card account at block 2280. The participant reenters his PIN number as an electronic signature or keys a requested confirming number at block 2300 to verify that all options selected are indeed agreed upon.

If no authorized loan amount has been selected, the unauthorized loan request and available loan data may be printed and mailed to participant at block 2290. In addition, the data is stored for future customer service inquiries at block 2310.

Present Value Percentage (PV %)

Figure 7:
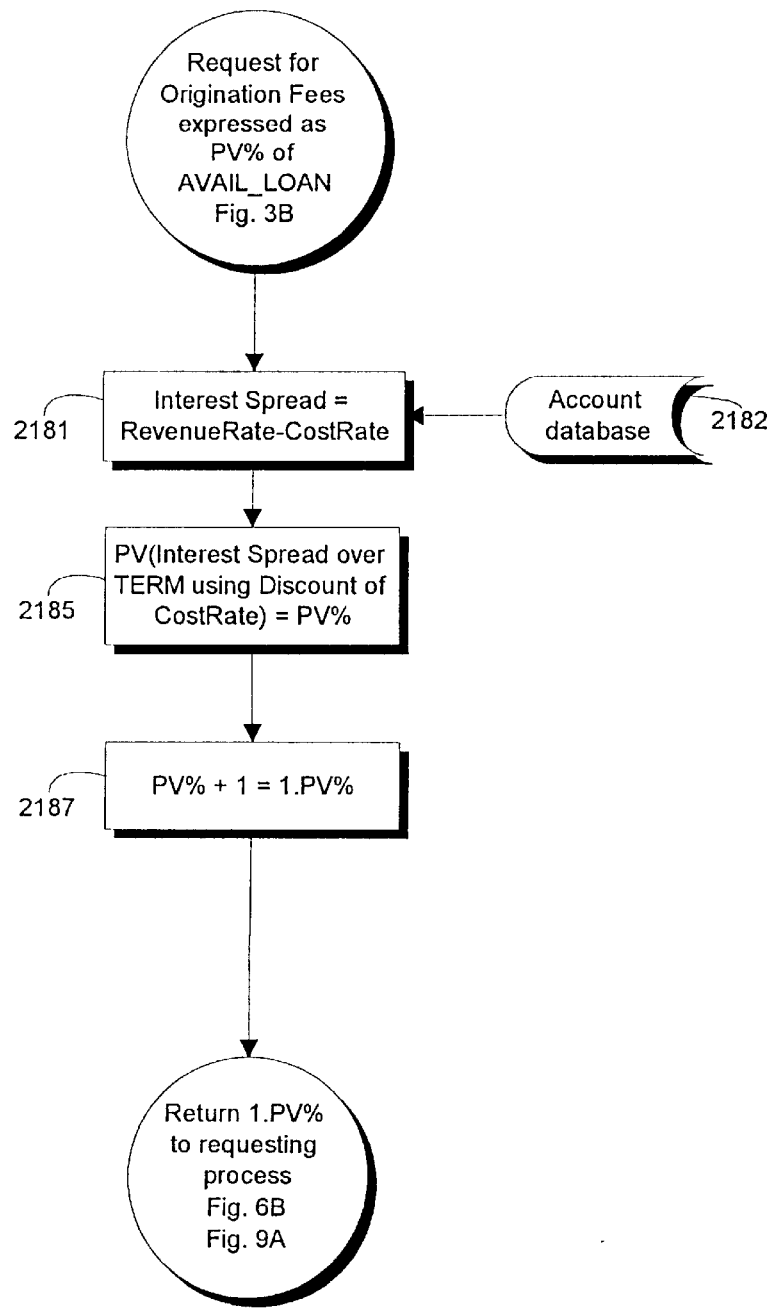
FIG. 7 is a logic flowchart depicting the determination of present value factors.

Referring now to FIG. 7, a logic flowchart depicts the determination of present value factors. A variable referred to as the present value percentage (PV %) is determined for the purpose of calculating in other routines the maximum loan amount after considering origination fees that do not exceed other loan limits. Additionally, the PV % provides a ready factor to determine the origination fees on any loan amount. The interest spread between the variable rate charged to participants and the variable rate charged by the Loan Fund is determined at block 2181 by obtaining the necessary interest rate inputs from the Interest Rate database, block 2182. The spread is assumed to remain constant throughout the life of the loan. The spread is saved in the participants loan account record to determine interest calculations during loan servicing. The present value of the interest spread over the term of the loan is calculated at block 2185 using the Loan Fund cost of funds as a discount rate. Note that the spread is considered an annuity expressed as a percentage rather than in dollar terms. Consequently, the present value of the spread annuity is also a percentage present value relevant to the maximum available loan that can be authorized after considering origination fees. The present value percentage (PV %) may be multiplied by any given loan amount after the loan is authorized to determine the necessary origination fees. Further, for the Authorization routine the PV % is added to 100% at block 2187 to provide a readily available divisor to determine the maximum loan amount after considering origination fees. Note that certain present value calculations above may be performed and stored in tables for ongoing reuse without departing from the scope and spirit of the present invention.

Retirement Planner

Figure 8A:
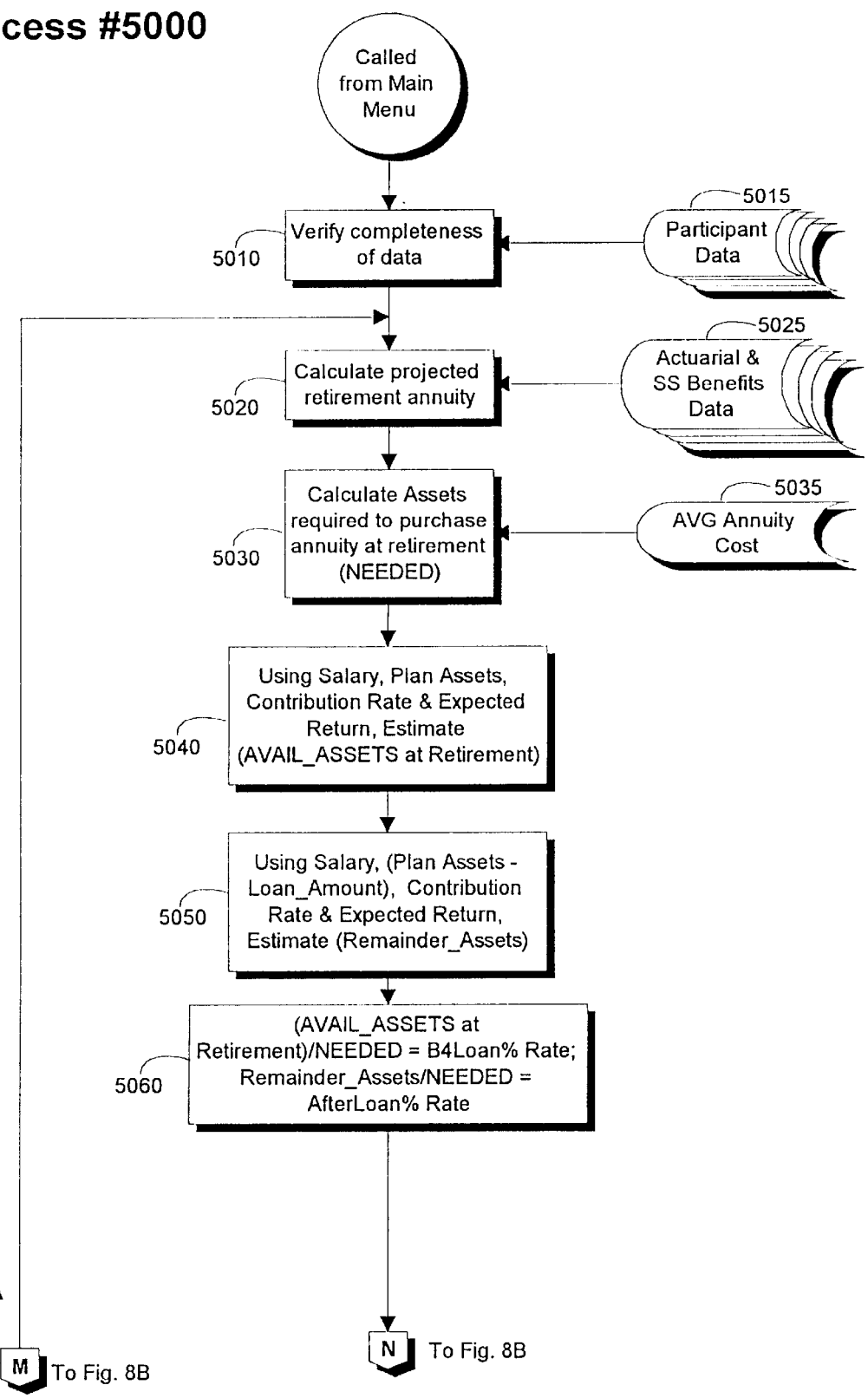
FIGS. 8A–8B is a logic flowchart depicting the retirement planning safeguards.

Referring now to FIG. 8A, a logic flowchart depicts the retirement planning safeguards. A streamlined retirement planning process is utilized to summarize complex actuarial information into a simplified Retirement Security Index. To perform the retirement planning calculations, demographic data on the participant is first sought in the CLMS database and/or the TPA database block 5015. Demographic data would include, but is not limited to, age, salary, estimated salary increases if determined, contribution rates, market value of plan assets, expected return related to investment choices if determined, and expected retirement age. The completeness of the data is verified at block 5010, and to the extent additional data is necessary the participant is requested to input. For example, the database may not have the participants age, marital status, and current income level. The participant would key in this data through an interface device after being prompted. Participant will have the option of defaulting to certain estimates determined by previous analysis of an actuary and/or the employer and/or the investment manager(s). For example, estimated salary increases and expected returns on investments may be more readily estimable by an actuary, employer, and/or investment manager.

Next, a required annuity is determined for the participant at block 5020 over and above the estimated Social Security retirements benefits input via block 5025. Simplifying assumption(s) are used with respect to Social Security benefits payable to the participant where various assumptions are assumed such as, but not limited to, the participant is assumed to have worked the necessary quarters to earn full benefits. The participant is provided a form (not shown) to apply to the Social Security Administration to obtain a direct estimate from that body regarding benefits available. Upon receiving the returned estimate from the Social Security Administration, the participant may reenter the data and rerun the model. The additional annuity plus Social Security benefits should provide an average reasonable standard of retirement living as determined by retirement planning experts. The additional annuity is converted at block 5030 to a lump sum at the age of retirement using average costs provided by insurance companies to provide such annuity benefits. This is the amount that would be needed in the plan at retirement age to purchase an annuity that would adequately supplement Social Security to provide an adequate retirement standard of living. An estimate of available assets at retirement age is determined at block 5040 utilizing current plan assets, salary, contribution rate, expected return on investments, and expected salary increases. The same calculation is thus performed in block 5050, only this time subtracting the loan amount from plan assets. This takes a somewhat pessimistic view that the loan amount is used for entirely disposable purposes without considering the possibility of another investment purpose (e.g. home purchase). However, altering the manner in which the loan is assumed to impact the estimated available assets at retirement age does not depart from the scope and spirit of the Retirement Security Index. Those skilled in the actuarial arts will be readily able to determine the above calculations.

Ratios of estimated retirement assets to estimated assets needed at retirement are calculated at block 5060 for both pre-loan and post-loan. For example, if at retirement age estimated retirement assets available are $500,000 and estimated retirement assets needed are $1,000,000, the index would indicate retirement security is at 50%. Adequate retirement security is considered an index score of 100% or greater. Next, the model would calculate the ratio of assets available after the loan is taken out to assets needed. The Retirement Security Index in the above example would drop from 50% to some lower percentage. Consequently, the participant receives immediate and timely information regarding the impact of potential borrowing before such borrowing occurs. Further, the participant receives important information regarding the adequacy of retirement savings irrespective of any borrowing activity.

Figure 8B:
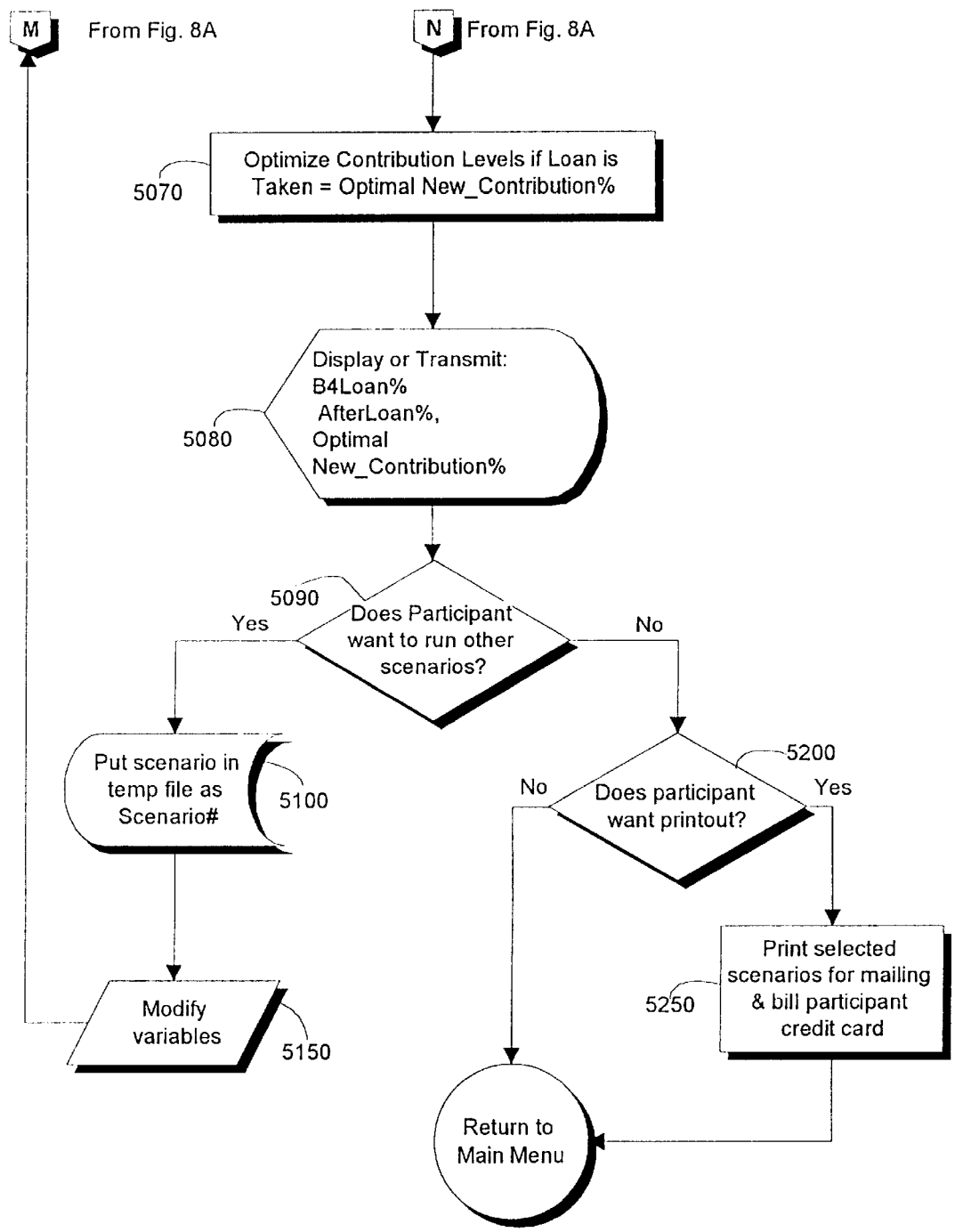

Referring now to FIG. 8B, a logic flowchart continues to depict the retirement planning safeguards. The system optimizes contribution rates at block 5070 to provide the participant with necessary contribution rate increases to achieve an index of 100% or better. The various index levels are displayed to the participant in block 5080. The participant is provided the option of running other scenarios, changing any number of variables via inputs 5090, 5100 and 5150, such as wage increases and expected return on assets. Additionally, the participant may request a printed copy to be mailed to him at blocks 5200 and 5250 for a fee, showing all assumptions used and graphically depicting the effect of the various scenarios. Note that the participant receives periodically a statement graphically comparing retirement saving status to actuarial or other determined goals (not shown), thereby providing ongoing monitoring and opportunities for retirement saving behavior modification. All communication to participants discloses important assumptions made in the model either by the participant, actuary, or other party. If the routine was called from within another subroutine it returns to that subroutine, and if not, it returns to the systems main menu.

Originations

Figure 9A:
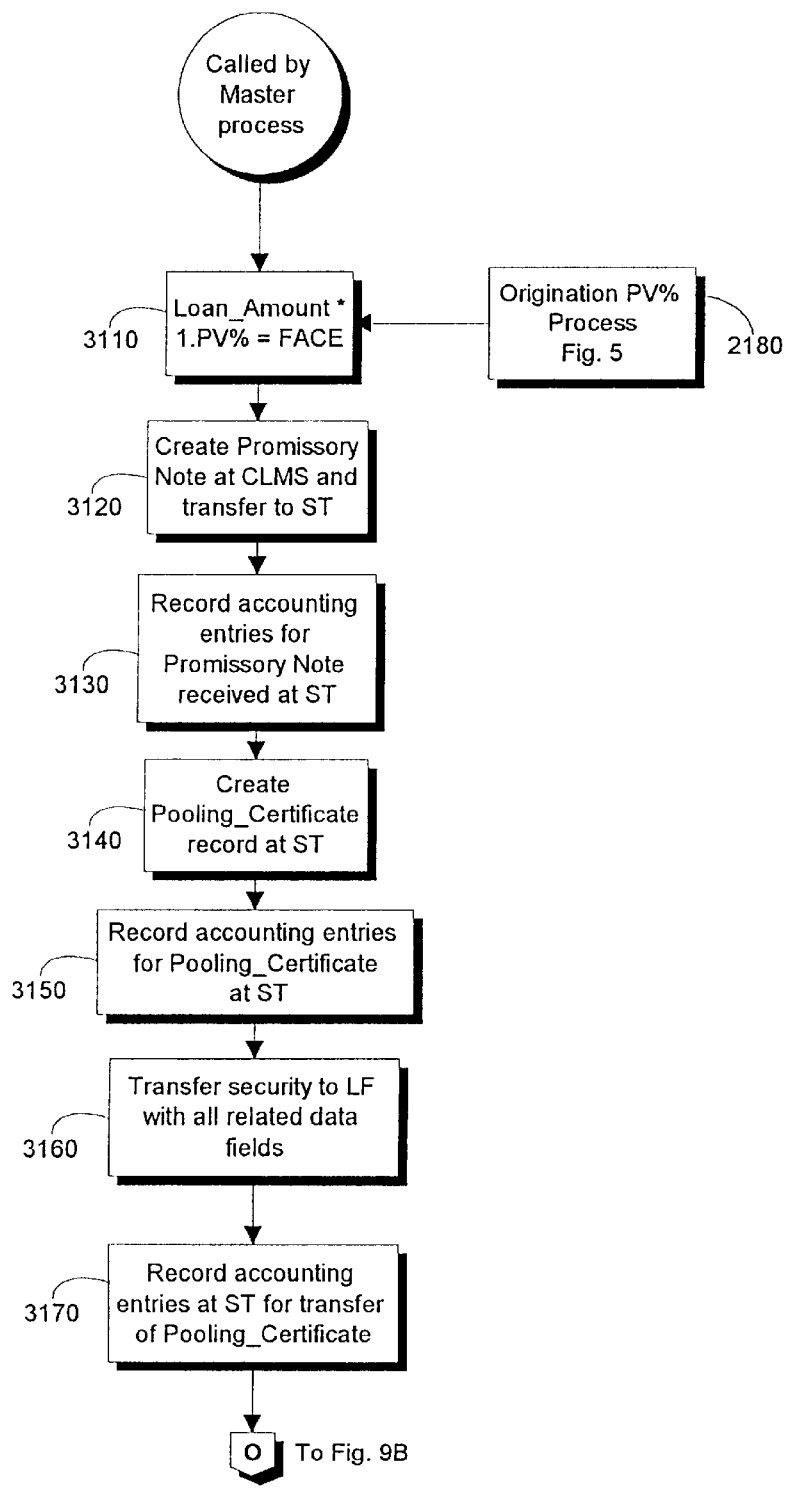
FIGS. 9A–9B is a logic flowchart depicting the origination of loan amounts.

Referring now to FIG. 9A, a logic flowchart depicts the origination of loan amounts. The applicable present value factors are obtained from the stored output of the Origination PV % Process, block 2180. The authorized loan amount (Loan_Amount) is multiplied by 1.PV % and PV %, resulting in the FACE amount of the loan and the origination fees (Org_fee), respectively, at block 3110. This operation adds the origination fees to the cash amount of the loan expected to be received by the participant.

A promissory note in the FACE amount of the loan is created and posted at block 3120 to the ST by the CLMS at the direction and authorization of the participant. The relevant accounting entries are made at block 3130 as follows:

| Promissory Note | Face |
|---|---|
| A/P to participant | (Face) |

A Pooling Certificate representing the promissory note obligation is also created in the ST at block 3130. The relevant accounting entries are recorded at block 3150 as follows:

| Pooling Certificate | Face |
|---|---|
| Promissory Note contra account | (Face) |

The ST conveys the Pooling Certificate to the LF at block 3160 established under a common trust based on the instructions of the participant. A preferred embodiment would have the ST transfer the Pooling Certificate to a common trust which would pool elements of the securities and hold the pools of securities as an intermediary step on behalf of the plurality of ST's. Additionally, the LF receives detail from the ST regarding the Pooling Certificate purchased including, but not limited to, related promissory note number, account number, loan amount, origination fees and instructions regarding cash disbursements.

The accounting entries recorded at block 3170 for the ST upon conveyance of the Pooling Certificate to the LF would be as follows:

| Receivable from LF | Face |
|---|---|
| Pooling Certificate | (Face) |

Figure 9B:
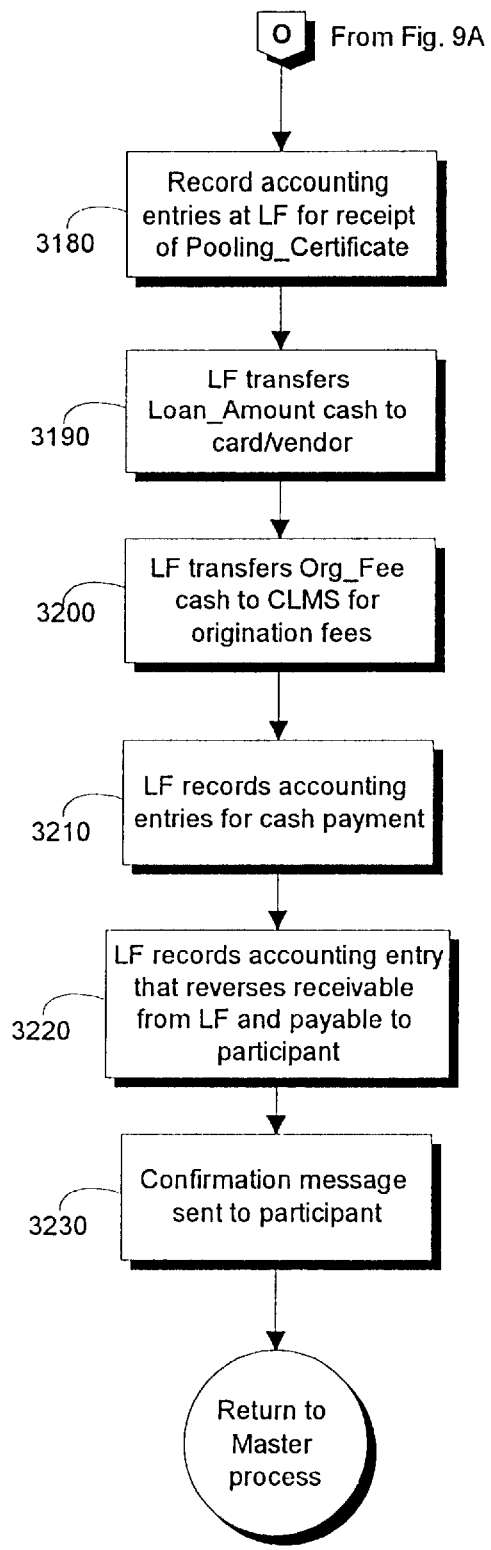

Referring now to FIG. 9B, a logic flowchart continues to depict the origination of loan amounts. The LF establishes a payable at block 3180 after receiving the

| Pooling certificate | Face |
|---|---|
| Loan_Amount Payable | (Loan_Amount) |
| Org_fee Payable | (Org_fee) |

Then the LF transfers cash at the direction of the CLMS or ST, blocks 3190 through 3210:

| Loan_Amount Payable | Loan_Amount |
|---|---|
| Org_fee Payable | Org_fee |
| Cash | (Face) |

The LF may perform a daily wire or ACH transfer of the respective loan amounts to the participants designated account and of the origination fees to the CLMS after sorting and grouping payments by card/vendor and CLMS.

Upon payment of the cash by the LF at the direction of the ST, the ST may consider the Pooling Certificate paid for, allowing the following journal entry at block 3220:

| A/P to participant | Face |
| Receivable from LF | (Face) |

Minimum Payments

Figure 10:
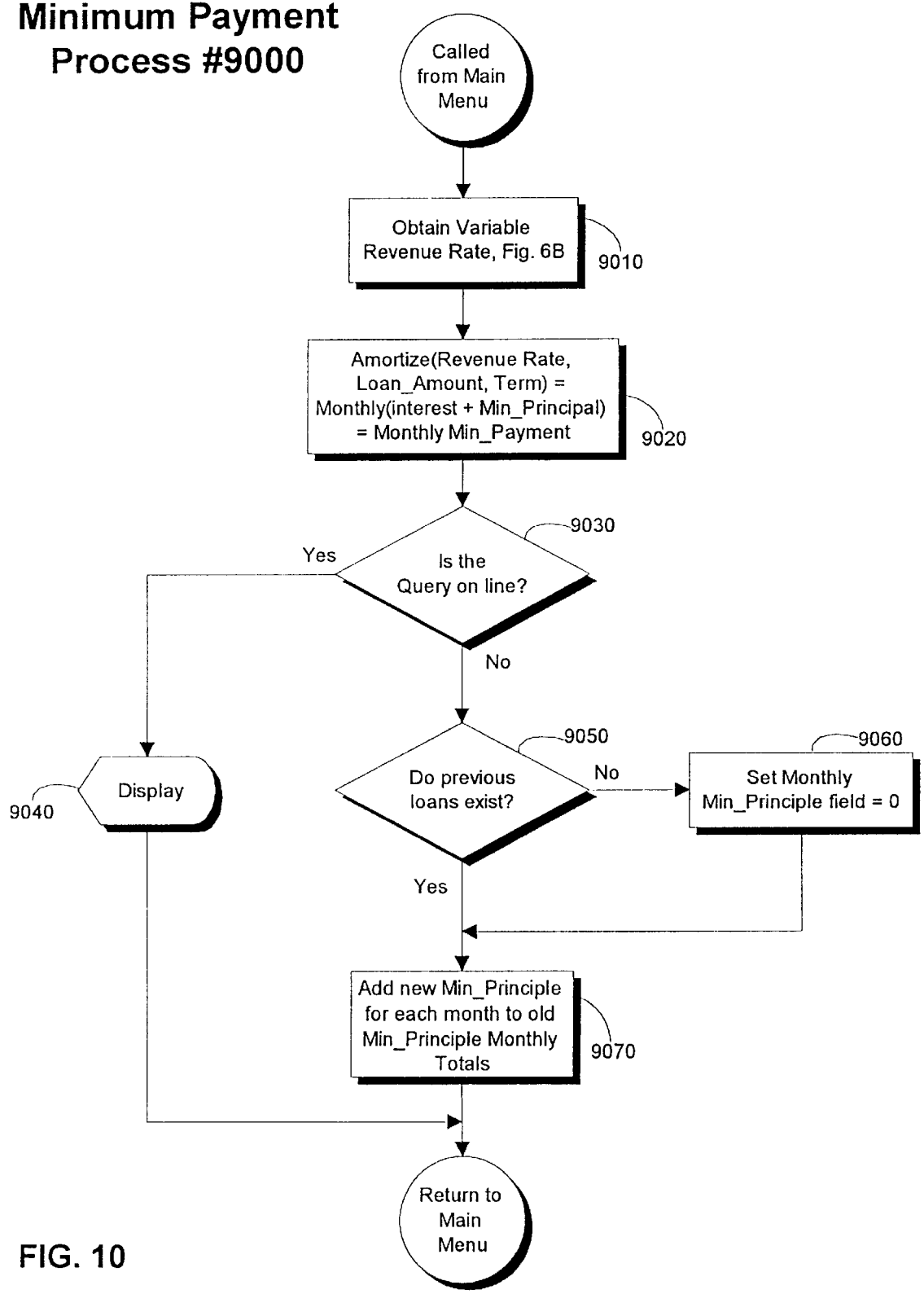
FIG. 10 is a logic flowchart depicting the determination of minimum payments.

Referring now to FIG. 10, a logic flowchart depicts the determination of minimum payments. After a loan has been originated, the Master Create Loan process calls the Minimum Payment subroutine to update the minimum monthly principle that must be repaid each month. The revenue interest rate is obtained at block 9010. The revenue rate is used as a fixed rate for the amortization calculations in block 9020. While the rate applied each month is actually variable, use of the revenue rate at loan inception provides a reasonable estimation of the required monthly principle payments. Consequently, this allows pension-based loans to be repaid in substantially equal payments. If the query is on-line with a participant as determined at block 9030, the expected monthly payments are displayed at block 9040, and control is returned to the main menu or the query process where the participant is interacting. If the calculation does not relate to an on-line query, the new minimum principle amount is added to any prior amount and stored for the next billing cycle, blocks 9050 to 9060.

Servicing

Figure 11A:
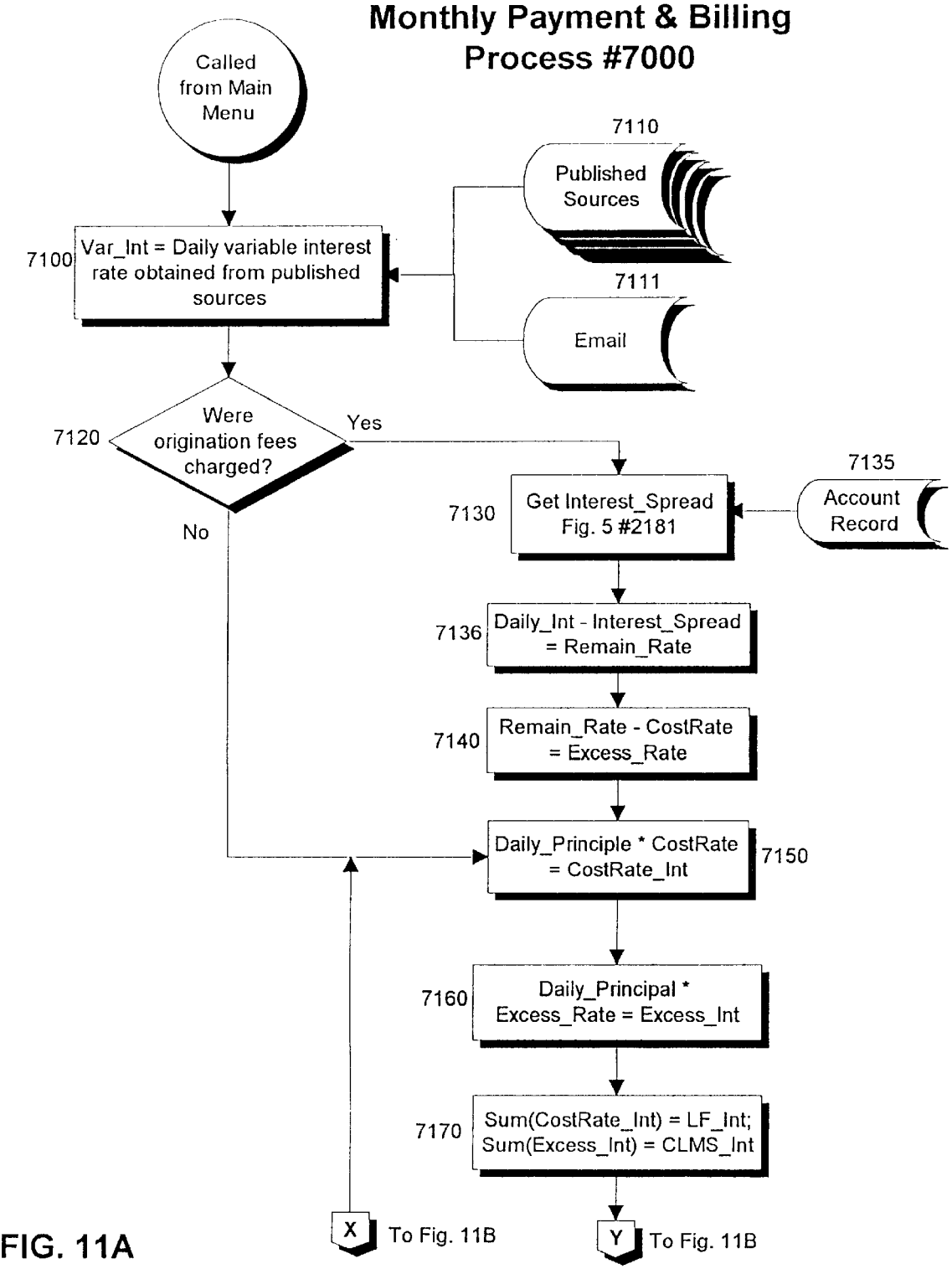
FIGS. 11A–11B is a logic flowchart depicting the determination of variable minimum monthly payments and billing.

Referring now to FIG. 11A, the logic flowchart depicts the determination of variable minimum monthly payments and billing. The daily variable interest rate is obtained from published sources in accordance with the Promissory Note, block 7100. The daily variable rate is stored in a database, block 7110, and is the daily annual percentage rate ("APR") each participant has agreed to pay. At block 7120, it is determined if origination fees were charged, which may vary from account to account and over time. The spread or portion of the APR that was taken as origination fees is obtained at block 7130 from the loan origination database (originally determined and stored at block 2181, FIG. 7). The daily variable rate is reduced by the spread, if any, to determine the remaining variable rate to apply to the daily principal balances. The remaining rate is separated at block 7140 into the portion payable to the LF (i.e. CostRate) and the remaining portion payable to the CLMS. Each day's principal balance is multiplied by the variable rate(s) applicable that day, using a conventional 360 day/year calculation, with the total interest for all days in the billing period accumulated in LF_Int and CLMS_Int, blocks 7150 through 7180. Various LF's may compete using a combination of APR rates, origination fees, and other features to meet the participants requirements. As a result, on a given day a variety of different rates may apply to different participant loan balances.

Figure 11B:
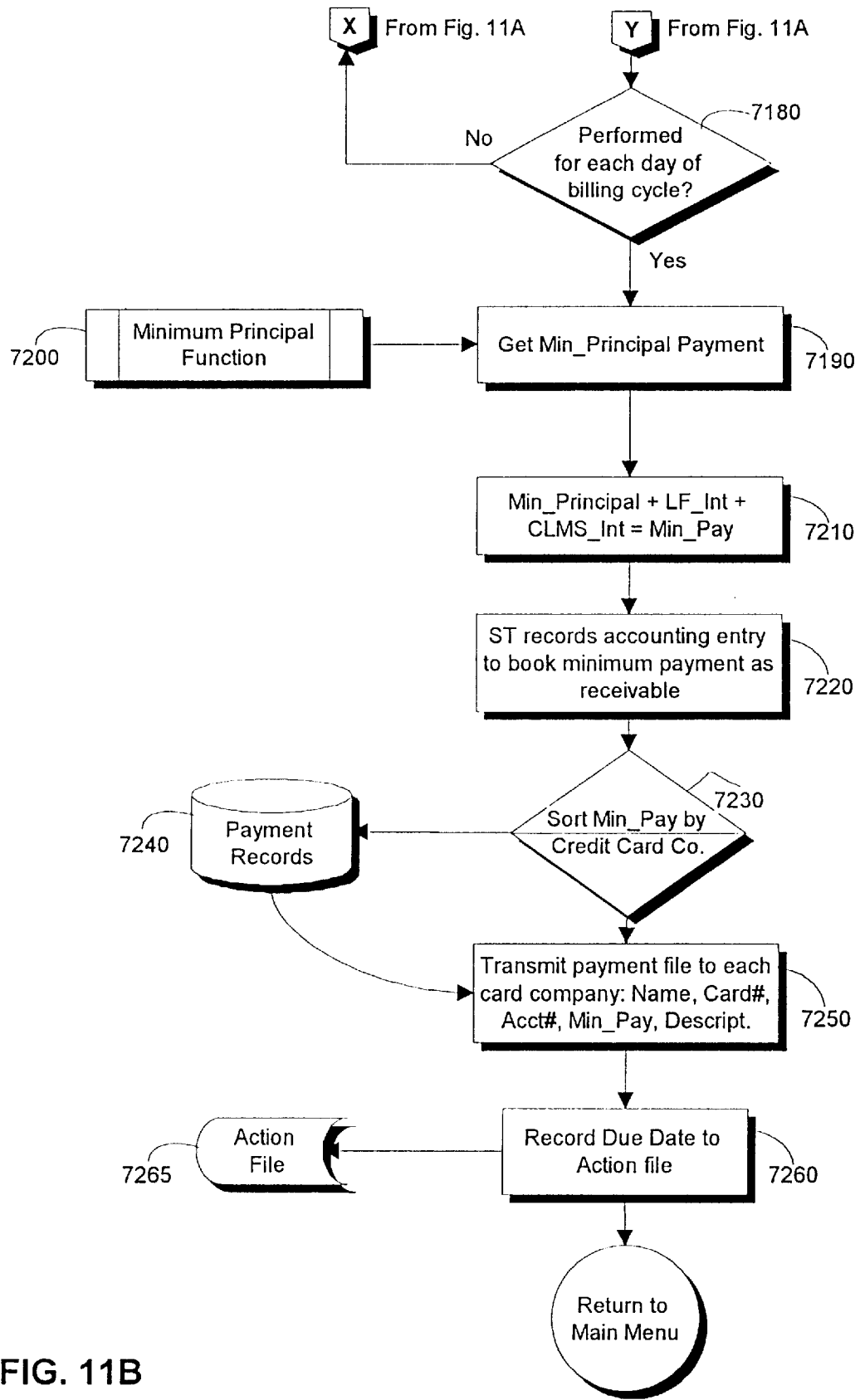

Referring now to FIG. 11B, the logic flowchart continues to depict the determination of variable minimum monthly payments and billing. The expected minimum principal payment is obtained at block 7190 from the output of a separate subroutine at FIG. 10, block 7200, using a fixed rate, the payment term and the month of payment to yield Min_principal (the fixed rate is the variable revenue interest rate in effect at loan origination). The minimum payment is calculated and billed based on a periodic billing cycle and is applied based on that cycle even if less than 30 days from the receipt of the loan proceeds. The variable interest and expected principal payment is summed at block 7210 to yield the monthly minimum payment (Min_pay) for each account. In this manner, the participant continues to pay substantially equal monthly payments while keeping variable interest charges current. The accounting entries for the minimum payment charge are booked at block 7220 by the ST as follows:

| Minimum payment receivable | Min_pay |
| Promissory Note-principal | (Min_principal) |
| Interest Payable-LF | (CostRate Variable Interest) |
| Interest Payable-CLMS (if any) | (Excess Interest over CostRate-ST fee) |
| Interest Expense | Total interest-ST fee |
| Interest Income | (Total interest) |

All minimum payments are sorted at block 7230 by the credit card company, creating a payment file 7240 for each credit card company. The payment files are processed at block 7250 in batch mode in the preferred embodiment to each credit card company where each record contains but is not limited to the credit card account number, the minimum payment amount, and a message describing the nature of the charge. As receipt of payment from the credit card company (s) may take several days, an aged receivable file is set at block 7260 to ensure action is taken if the payment receipt file is not processed by the expected due date.

Minimum Monthly Payments

Figure 12A:
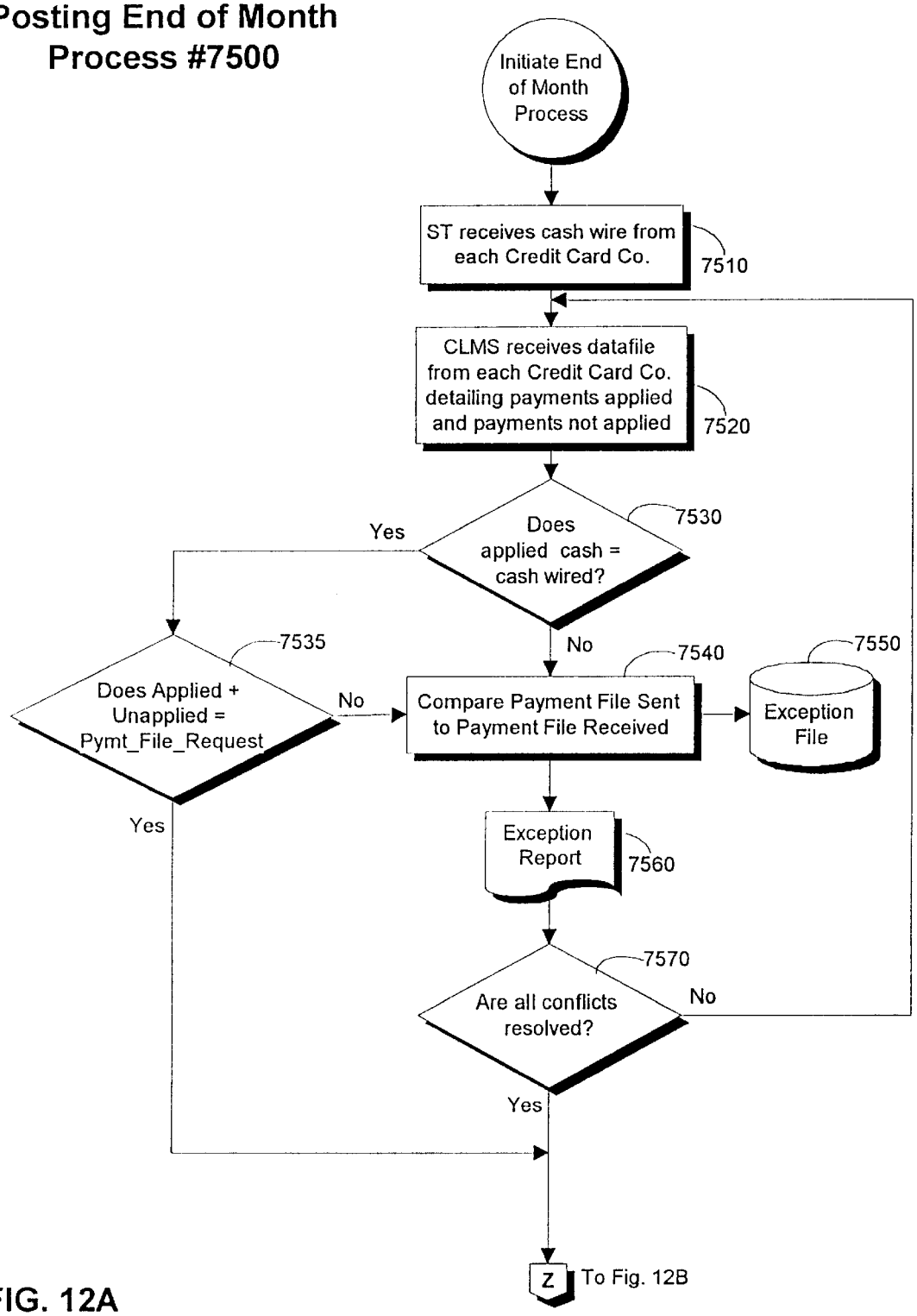
FIGS. 12A–12C is a logic flowchart depicting the receipt and posting of variable minimum monthly payments.

Referring now to FIG. 12A, a logic flowchart depicts the receipt and posting of variable minimum monthly payments. The credit card company(s) apply the minimum payment charges to the applicable credit card account and wire or ACH transfers cash at block 7510 to the ST. The credit card company also transmits a data file to the CLMS at block 7520 that details those payments applied and those payments requested but not applied. The reminder file set in block 7265 (see FIG. 11B) is turned off upon receipt of the card company transmissions. The sum of the payments applied is tested at block 7530 to ensure it equals the cash remitted. Also the sum of the applied and non-applied minimum payment requests is compared at block 7535 to the total payment request provided to the card company. If either of these tests fail, a record by record comparison is made at block 7540 between the two files sent to the card company and the file received. Both an electronic exception file report 7550 and a paper based exception report 7560 are generated for resolution.

The payment file is not posted until the files are brought into agreement in block 7570.

Figure 12B:
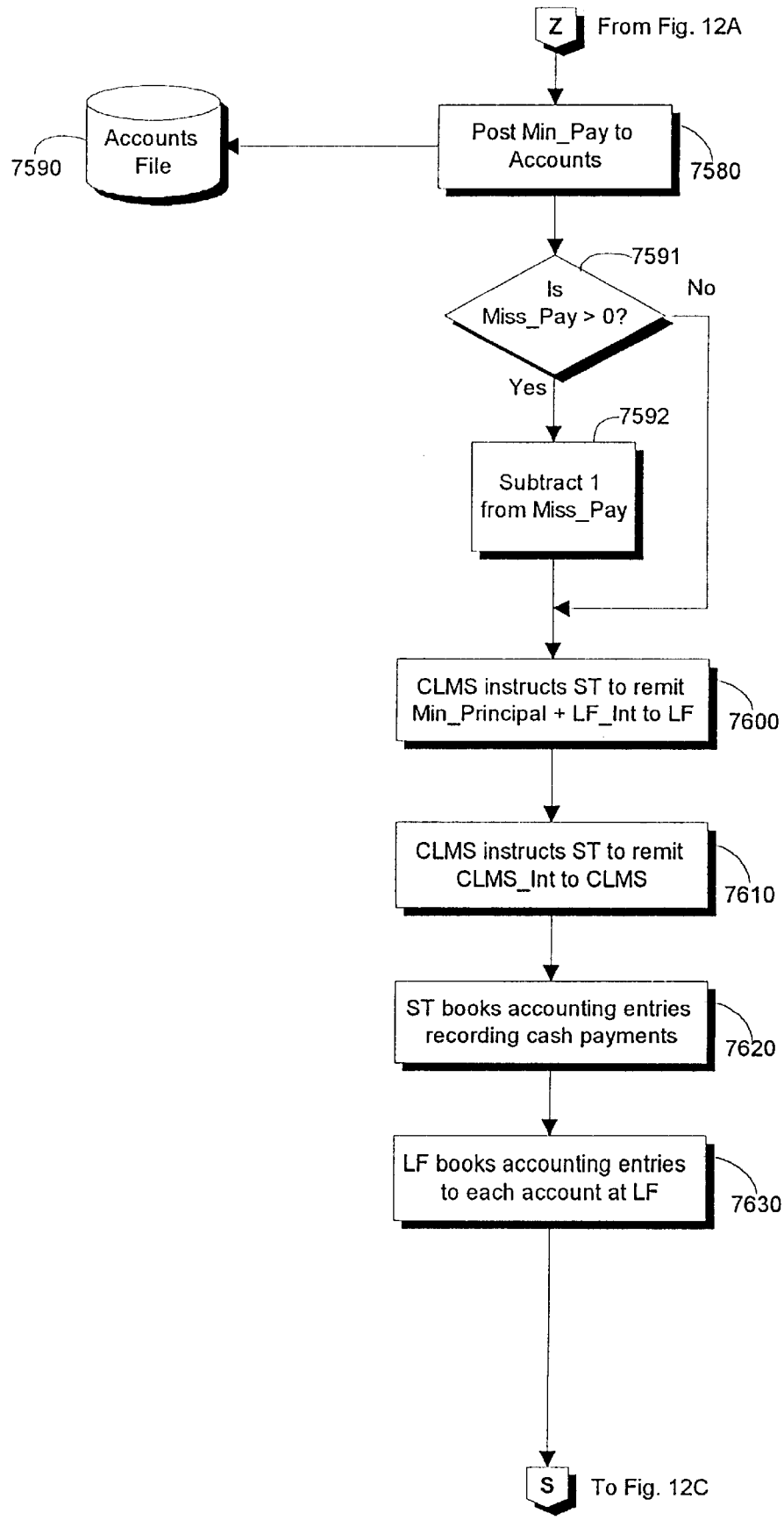

Referring now to FIG. 12B, a logic flowchart continues to depict the receipt and posting of variable minimum monthly payments. The CLMS posts all minimum payments at block 7580 to the appropriate separate Loan Account file 7590, with the following accounting entry:

| JE where ST receives cash | |
| --- | --- |
| Cash received | Min_pay |
| Minimum payment receivable | (Min_pay) |

The number of missed payments variable is checked at block 7592 after posting a minimum payment and decremented.

The CLMS instructs the payments received by the ST to be distributed at blocks 7600 and 7610, in the following components described by the journal entry in block 7620:

| JE where ST distributes cash | |
|---|---|
| Promissory Note-principal | Min_Principal |
| Interest Payable-LF | LF_int |
| Interest Payable-CLMS | CLMS_int-ST fee |
| Cash | (Min_pay-ST fee) |

The LF upon receiving the cash records the following entry in block 7630 to the participants LF account:

| Cash | LF_int + Min_Principal |
|---|---|
| Interest Income | (LF_int) |
| Partial repurchase of Pooling Certificate | (Min_Principal) |

Charging the minimum payment to the associated credit card is the preferred embodiment. The pension based lending industry has predominantly relied on payroll deductions with the current prevailing belief that payments should be payroll based. However, this causes the employer to be in the loan servicing business where its payroll department has to make ongoing changes to minimum payment amounts. Combining the payment process with the normal credit card creates synergies and efficiencies while reducing benefit costs for employers. This combination of payment processing is a significant feature of the pension plan loan management system of this invention. However, an alternate payment processing embodiment would involve transmitting the payment file to the employer and receiving payroll deducted amounts from the employer. Another alternate embodiment would involve the participant sending a payment directly to the CLMS.

Figure 12C:
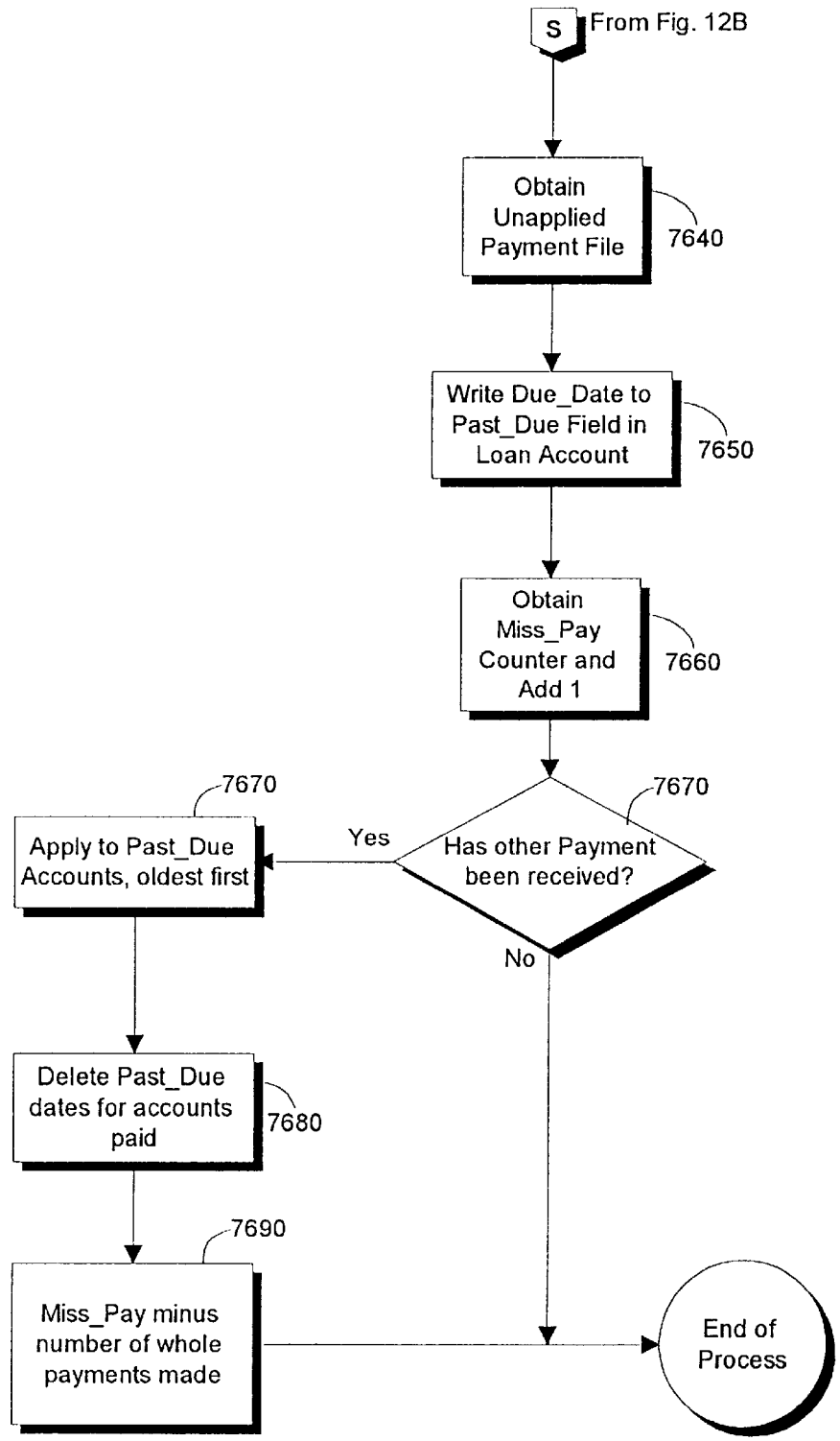

Referring to FIG. 12C, the Unapplied Payment File is obtained at block 7640 which represents those accounts billed a minimum payment but remaining unpaid. The missed payments counter is checked to determine if greater than or equal to zero (not shown), if not then no past due date is written to the Loan Account. If zero or greater, then the payment due date is written at block 7650 to the Loan Accounts' set of past due fields, with a potential six past due fields for each Loan Account. Then the missed payment counter is increased by one at block 7660. Other miscellaneous or prepaid amounts are checked at block 7670, and if there are any they are posted at block 7670 to the oldest past due amount first. To the extent an entire past due amount has been paid, the related past due date is deleted from the Loan Account at block 7680. The missed payments counter is decremented by one count at block 7690 for each whole payment made. Note that if the payment is a prepayment, the missed payment counter will have a negative value which will buffer any future default tests. The process ends after all payments, or lack thereof, have been posted.

Service-Default

Figure 13A:
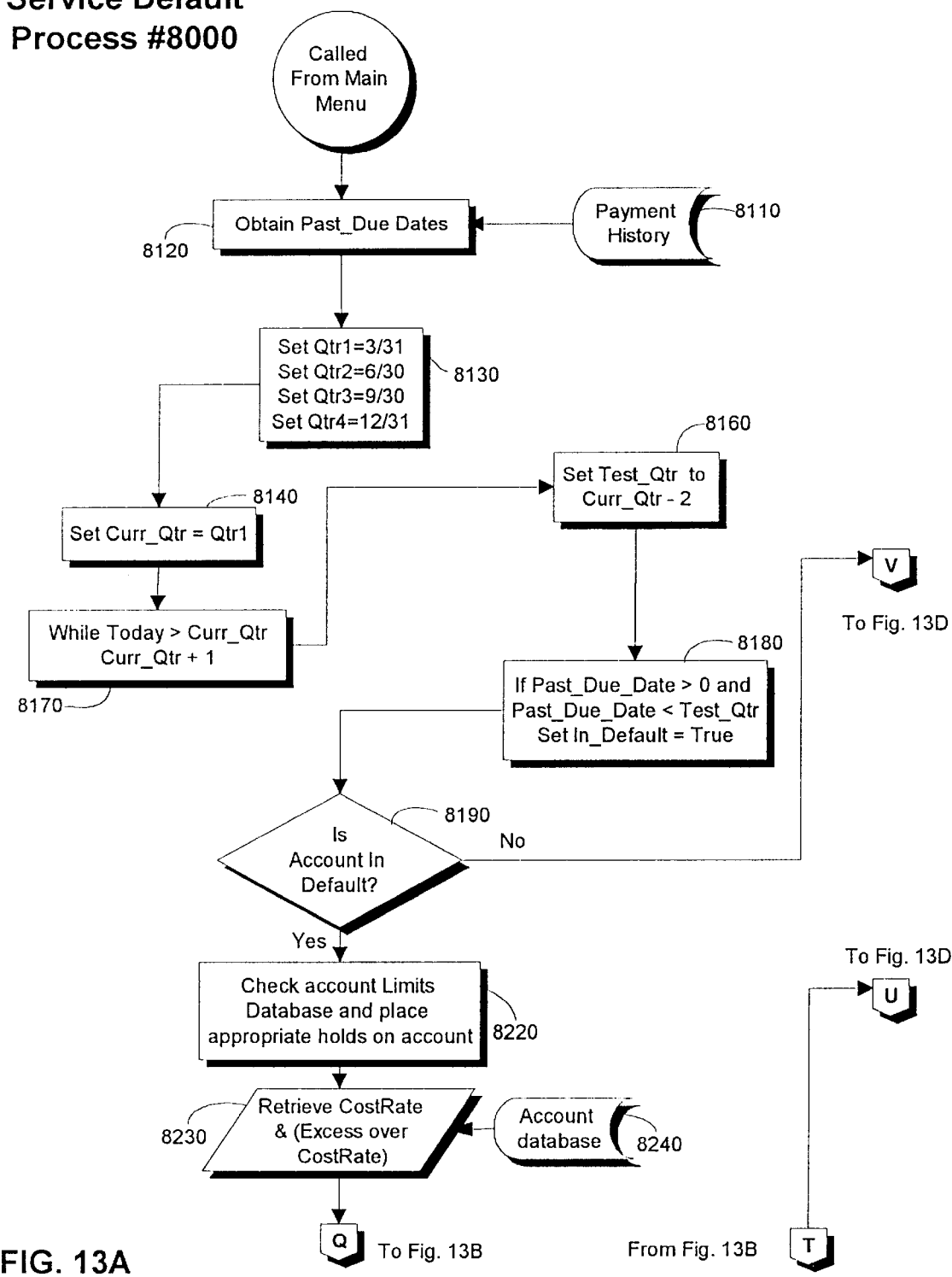
FIGS. 13A–13D is a logic flowchart depicting the determination of past due amounts and the initiation of default processing or credit counseling.

Referring now to FIG. 13A, a logic flowchart depicts the determination of past due amounts and application of default processing or credit counseling. Past due dates are obtained at blocks 8110 and 8120 from the payment history database. The test to determine if default has occurred on any past due accounts depends heavily on calendar quarter ends. Block 8130 creates a variable for each calendar quarter end cutoff date. A temporary variable is set at block 8140 for the current quarter end, initially set at the value of the first quarter end. The value is compared to the date the program is being executed and adjusted until the current quarter end has been established correctly. The quarter to be tested at block 8160 will always be two quarters prior to the current quarter. All past due dates for amounts remaining unpaid are compared to the test quarter at block 8180 with any older dates causing the account to be placed in default status. If the account is determined to be in default at block 8190, the limits database is checked to determine whether the pension plan requires the account to be placed on hold. Block 8230 starts a series of steps to determine the interest accrued to date for repurchasing the securitized promissory note. Interest rates are obtained from the interest rate database 8240. The applicable variable interest rates are obtained from the routine Servicing process (at block 7110, FIG. 12) which calculates at block 8230 the daily CostRate, for interest paid to the LF, and the Excess Interest Over CostRate, paid to the CLMS.

Figure 13B:
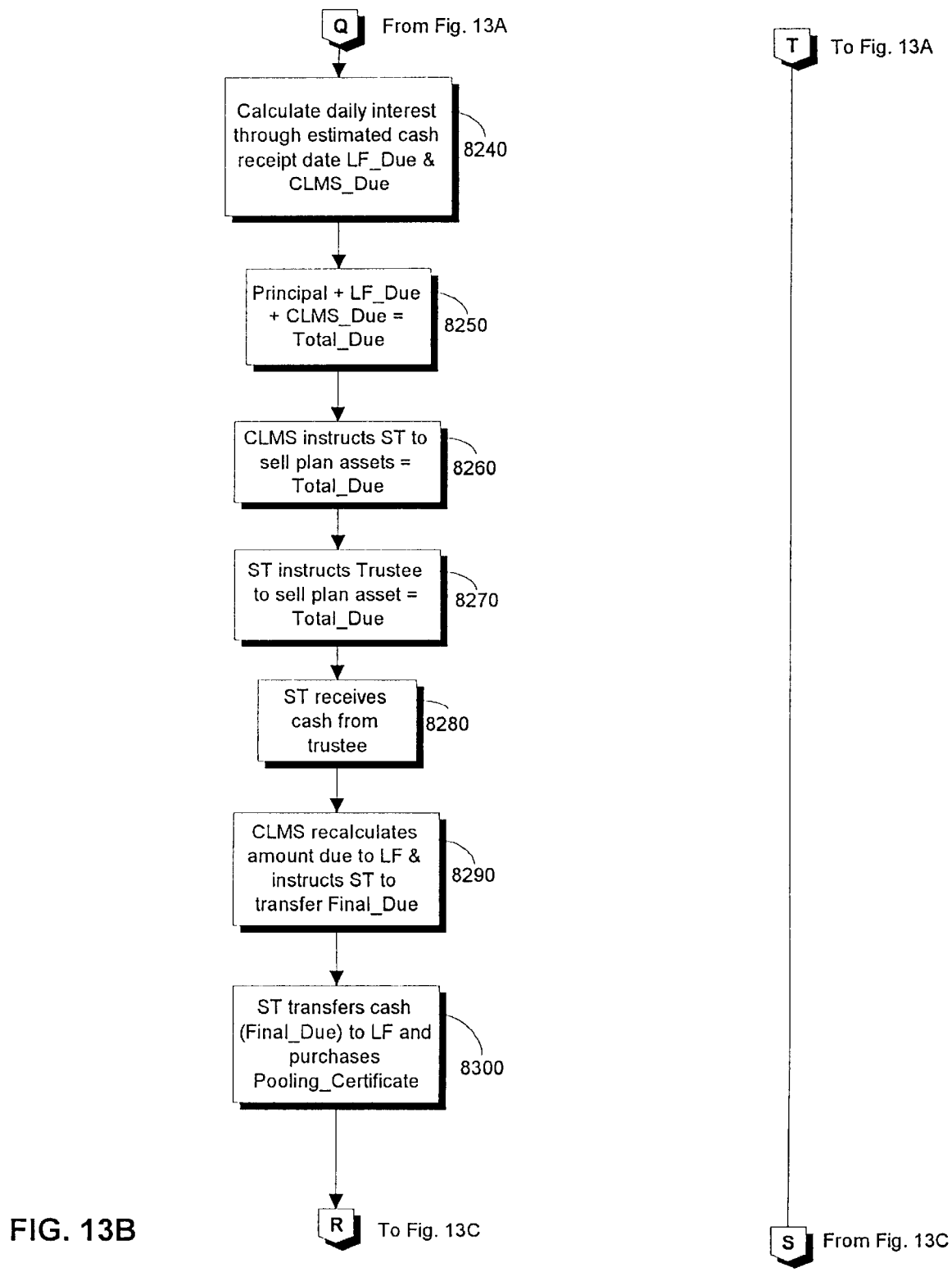
Figure 13C:
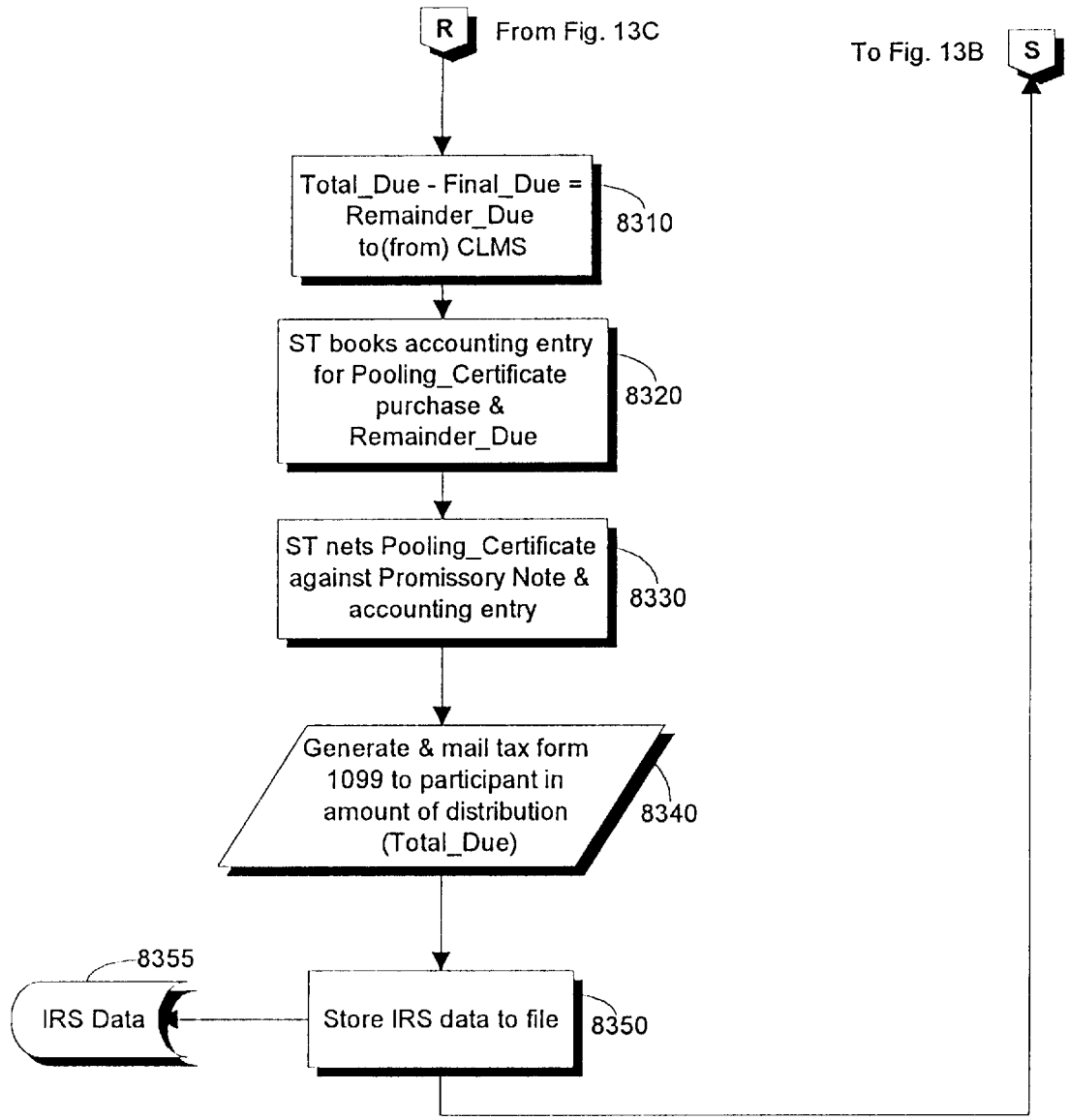

Referring now to FIG. 13B, a logic flowchart continues to depict the determination of past due amounts and application of default processing or credit counseling. The daily interest is calculated at block 8240 through an estimated liquidation date and accumulated in CostRate_due and Excess_due. An estimated date of Pooling Certificate liquidation is used based on expected receipt of cash by the ST from the Trustee, which may be 7 to 14 days beyond the date of performance of these calculations. The total principle due is added at block 8250 to the two interest due amounts to yield the Total_due amount. The CLMS instructs the ST at block 8260 to sell plan assets, if cash is not already available in the plans separate account, other than the Promissory Note to generate cash equal to the Total_due. The ST in turn provides the same instructions at block 8270 to the Trustee. The ST receives cash from the Trustee at block 8280 in the amount of Total_due. The CLMS recalculates the amount due to LF at block 8290 through date of receipt of cash to yield Final_due. The CLMS instructs the ST at block 8300 to transfer cash equal to Final_due to LF to purchase Pooling certificate.

Referring now to FIG. 13B, a logic flowchart continues to depict the determination of past due amounts and application of default processing or credit counseling. The CLMS subtracts Final_due from Total_due and remits or requests the remainder from the CLMS at block 8310. The ST books the accounting entries at blocks 8320 and 8330 as follows:

| Cash | Total_due |
|---|---|
| Asset Payable to Trustee | (Total_due) |
| Pooling Certificate | Final_due |
| Cash to LF | (Final_due) |
| Cash from (to) CLMS | Remainder or (Remainder) |

JE to eliminate Promissory Note after combining Pooling Certificate with note:

| Payable to participant | Principal |
|---|---|
| Promissory Note | (Principal) |

The CLMS creates and mails tax Form 1099 to participant at block 8340 regarding the amount of the taxable distribution. Additionally, the following accounting entry is made:

| Asset Payable to Trustee | Total_due |
|---|---|
| Taxable Distribution from from account to participant | (Total_due) |

Finally, the amount of the distribution and the taxpayers identification information is written to a file at blocks 8350 and 8355 for periodic and annual reporting to the Internal Revenue Service.

Figure 13D:
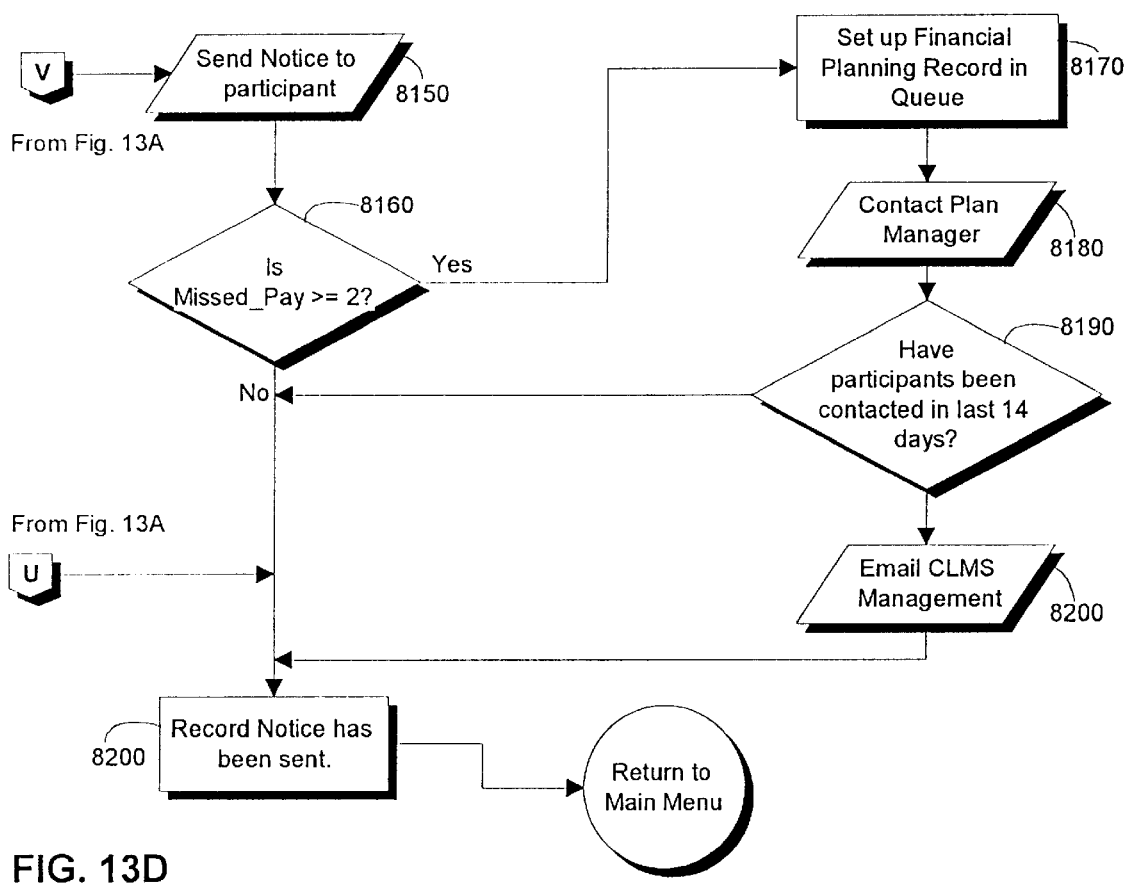

Referring now to FIG. 13D, a logic flowchart continues to depict the determination of past due amounts and application of default processing or credit counseling. Where the participant has been determined to be past due but not in default at block 8190 (See FIG. 13), the participant is sent a notice at block 8150. The notice describes his past due status, the retirement planning consequences of default, and offers a toll free retirement planning counseling line for assistance. If the participant has missed two or more payments as determined at block 8160, the account is added to the retirement planning que at block 8170. The participants to be contacted for retirement planning assistance are managed through a contact manager at block 8180 with monitoring of timely performance controlled through blocks 8190 and 8200. If the participant has missed only one payment, only the notice is sent. All actions, whether a notice sent, retirement planner contacts, or default distribution, are recorded in the accounts records at block 8200.

The pension-based liquidity processes of the present invention provide an efficient mechanism for increasing retirement security, for improving benefits for current retirement savers, and for enabling marginal and younger employees to begin saving earlier in their careers and in greater amounts. In addition, the liquidity system allows compensation programs to be restructured to allow a greater proportion of compensation to be placed into pension plans greatly mitigating the pending national crisis of unfunded or under funded retirements. Furthermore, the liquidity system of this invention has the following further advantages: (1) unsecured debt interest rates are reduced for many participants, thereby increasing disposable income and thus the capacity to save for retirement; (2) the reduced interest rates do not come at the expense of liquidated long term investments with hidden opportunity costs sharply increasing the real interest cost; (3) understandable retirement planning information is timely delivered to the individual to allow informed decisions to be made for both contributions and distributions; (4) individuals retirement plan to actuarial estimated goals are tracked and graphically depicted, thereby providing ongoing monitoring; (5) due to the liquidity systems portability features, pension-based loans after a job change will no longer become taxable distributions that severely damage retirement security; (6) common credit cards and related systems are harnessed to provide new synergy and efficiency for the retirement saver and retiree; and (7) trivial everyday consumption is buffered away from retirement assets onto traditional payment vehicles and is not secured against pension assets.

While the above description contains many specifics, this description should not be construed as limitations on the scope of the invention, but rather as an exemplification of a preferred embodiment thereof. Many other variations are possible. For example, the retirement planning process may be established as a separate module applied to some or all employees of a company prior, during, or after any change to an element of a pension plan, including but not limited to contribution changes and/or enrollment procedures. Further, the retirement planning process could be eliminated based on the judgement of the fiduciaries regarding other mitigating controls or preferences. Additionally, the retirement planning process could be made mandatory or optional based on the type of pension account activity or the degree of the activity being performed. The optimization of various contribution levels combined with various borrowing levels could be applied separate from other retirement planning and system processes to provide advance reference charts for individual participants.

The retirement planning index may be weighted for certain probabilities of error in the actuarial assumptions built into the calculations and expressed as a percentage with a probability of accuracy and a range with or without a probability of accuracy. The retirement planning index may also be combined with a monthly target savings amount expressed as dollars or a percentage of income to meet certain optimization goals. The index could be separated from the other processes and added to other retirement planning software.

Loan administration need not be performed by the CLMS but could be retained by the plan administrator connecting his system to the remaining CLMS system, therefore eliminating the need for loan administration within the CLMS. Likewise, a trustee could elect to perform the functions performed by the Sub-trustee, therefore eliminating the need for a Sub-trustee.

The Loan Fund could utilize a common trust to pool pooling certificates and segregate various elements of the pooling certificates (e.g., interest payments, scheduled principal repayments, and prepayments) into separate branches to be securitized. A pension plan could adopt the concepts of the present invention yet elect not to securitize promissory notes, thereby eliminating the need for Loan Funds or the common trust. Likewise, existing loan programs may adopt the current system to access loan securitization without issuing CREDIT CARDS. Further, the Loan Fund could obtain other forms of financing other than securitization, such as lines of credit, and still fulfill the function designed into the Loan Fund.

Interest rates need not be reduced to the lowest level possible, leaving rates comparable to other competitive lending sources. Pension plans may so elect to avoid encouraging pension based lending and to subsidize retirement planning services, credit counseling services, and other compensation based services provided to their employee base.

Employers may elect not to optimize matching contribution rates due to other compensation strategies while still utilizing the other functionality of the pension-based liquidity system. Likewise, participants may elect not to increase contributions while still utilizing the other functionality of the pension-based liquidity system. Employers may elect to not allow portability of pension-based loans while still utilizing the other functionality of the pension-based liquidity system.

CARDS serving as the payment front-end of the liquidity system could be eliminated with payments and distributions serviced by other means, including but not limited to payroll withholdings and checks or direct deposit. Conversely, CARDS could be further integrated into the payroll system, receiving monthly payroll amounts directly to the CARD account. Monthly statements and activity statements may be provided by the CARD company or may be provided by the CLMS independently or on behalf of the CARD company and the pension-based loan administration activities.

It should be understood that any reference in this application to unsecured credit card account, CARD, card account, vendor, or vendor account refers to a payment account in the name of the participant that exists either inside or outside of a conventional pension plan. The payment account allows a participant to receive goods, services, or cash in exchange for an agreement, either written or verbal, to pay the merchant or a third party on certain terms and conditions. Therefore, a payment account may be, but is not limited to, a credit card, a prepaid card, a debit card, a vendor in-house credit card, a bank account, a credit union account, a utility companies account, a landlords account, a mortgage companies account, a digital cash account, an accounting area within a separate pension account, or an accounting area associated with a separate pension account. Similarly, any reference in this application to a loan account and/or a credit account is intended to include, but not limited to, a liquidity account, an accounting area within a separate pension account, an accounting area associated with a separate pension account, and a distribution account. Also, any reference to "security sold" in this application includes, but is not limited, to a security conveyed or a security provided as collateral. Further, while a preferred embodiment involves the creation of a promissory note backed security, alternative embodiments may involve the sale of the promissory note or the use of the promissory note as collateral. Also, a security "sold" or a promissory note "sold" is intended to include any conveyance or transfer of the security or promissory note to be securitized or otherwise financed. Recordkeeper, Plan Administrator, and TPA are used interchangeably in this application, and SECURITY and Pooling Certificates are also used interchangeably.

Disbursing proceeds from an account to another account and repaying proceeds from an account to another account is equivalent to posting the appropriate journal entries to each respective account, thereby transferring spending power, whereby the actual transfer of cash may not be necessary due to offsetting amounts or the transfer of cash may be in a net amount. Likewise, a third party may actually transfer the actual cash based on the journal entries posted and the authority embodied in the respective accounts, the responsibility and accountability remaining with the respective accounts for the transfers consumated. Similarly, no cash may be transferred for some period with solely spending power transferred between accounts. Also, debiting an account with respect to the transfer of spending power indicates spending power or its cash balance has been reduced, while conversely crediting an account means the spending power or cash balance had been increased.

The clearinghouse platform represented by the CLMS may be integrated into an existing recordkeepers system and may be restricted as to the number of CARDS and the number of Loan Funds, thereby simplifying the number of necessary system interfaces and related data processing activities.

The liquidity system may eliminate the ability of vendors and/or banks from receiving distributions to simplify the number of authorized accounts set-up for distribution. Likewise, the liquidity system may use check payments when requested by the pension plan sponsor. The joint account application may be also separated into two separate applications, processed jointly or separately.

Origination fees may be eliminated with the remainder of the liquidity system operating without substantial effect other than interest costs would be potentially increased as revenues would no longer as clearly match costs. Conversely, the origination fee module may be separated and attached to some other pension administration system.

The process to determine variable minimum payments may be eliminated, with the remainder of the liquidity system operating without substantial effect as long as it is replaced with a fixed interest and fixed monthly payment process. Conversely, the variable minimum payment process may be separated and attached to some other pension administration system.

The default credit counseling may be eliminated from the default process with the liquidity system continuing to provide the benefits described. Conversely, the default credit counseling process could be separated and attached to some other pension administration system or employer benefit plan.

Those skilled in the art will appreciate that the accounting entries as disclosed herein may be altered to be in compliance with Generally Accepted Accounting Practice (GAAP) currently issued, in draft for commentary periods, or to be created without departing from the scope or spirit of the present invention. Additionally, the accounting entries may be changed to comply with current or future GAAP for securitized loans or securitized asset sales without departing from the scope or spirit of the present invention.

The foregoing description conveys to one skilled in the art an understanding of the objects, features and advantages of the invention, and the manner and process of working and using a system according to this invention. The above described embodiments are merely illustrative and should not be construed in a limiting sense. Numerous modifications and adaptations thereof will be readily apparent to those skilled in the art without departing from the spirit and scope of the invention, which is defined by the following claims.

What is claimed is:

1. A method of improving the liquidity of a pension-based account for a pension participant within a pension plan, comprising:

separating the pension-based account for the pension participant into a plurality of pension-based accounts including a liquidity account;

transmitting data to the participant relating to the liquidity account;

monitoring the participant directions related to the pension-based account;

determining disbursement proceeds with a computer means resulting from the liquidity account in response to a participant direction; and crediting the disbursement proceeds to a payment account with the computer means.

2. The method of claim 1, further comprising:

debiting the payment account or another payment account to credit the liquidity account in response to a participant direction to service the disbursement proceeds.

3. The method of claim 2, wherein debiting the payment account to credit the liquidity account further comprises:

repaying the disbursement proceeds from a payment account used by the pension participant with a loan repayment directed by the participant made in contribution with other payments owed by the participant on the payment account.

4. The method of claim 1, wherein crediting the disbursement proceeds includes routing the disbursement proceeds to a payment account unsecured against the pension-based account.

5. The method of claim 1, further comprising:

determining disbursement proceeds includes determining proceeds for a plurality of pension-based loans; and aggregating a minimum repayment for various pension-based loans to determine a minimum loan repayment to the liquidity account.

6. The method of claim 1, further comprising:

distributing payments from the payment account to a participant directed payee utilizing an established clearinghouse.

7. The method of claim 1, further comprising:

disbursing payments from the payment account to one or more vendor accounts utilized by the pension participant.

8. The method of claim 1, further comprising:
originating a plurality of disbursement proceeds each resulting from the liquidity account.

9. The method of claim 1, further comprising:
pre-funding pension-based loans to meet requirements for the payment account when a pension participant's creditworthiness cannot support sufficient unsecured credit.

10. The method of claim 1, further comprising:
modeling an effect of a taxable distribution on the pension-based account to provide financial counseling to the pension participant of a liquidity account in delinquency.

11. A method of securitizing a loan with a pension-based account of: a pension participant within a pension plan, comprising:
separating the pension-based account for the pension participant into a plurality of pension-based accounts including a liquidity account;
creating a promissory note from the participant and transferring the promissory note as an asset to the liquidity account;
receiving a participant direction to convey a security representing rights of the promissory note;
conveying the security to a purchaser;
determining disbursement proceeds based on the promissory note with a computer means; disbursing the disbursement proceeds;
repaying the disbursed proceeds without liquidating investments within the pension-based account; and
crediting the repaid disbursed proceeds to the pension-based account with the computer means.

12. The method of claim 11, further comprising:
aggregating a plurality of securities each representing rights of a respective promissory note; and
conveying the aggregated plurality of securities to a loan fund.

13. The method of claim 11, further comprising:
receiving a loan application for supporting a plurality of loans from the liquidity account.

14. The method of claim 11, further comprising:
disbursing the disbursement proceeds includes distributing proceeds for a plurality of pension-based loans; and
aggregating a minimum repayment for various pension-based loans to determine a minimum loan repayment to the liquidity account.

15. The method of claim 11, where disbursing the disbursement proceeds includes routing the disbursement proceeds to a payment account unsecured against the pension-based account.

16. The method of claim 11, wherein servicing the conveyed security comprises:
repaying said disbursement proceeds from a payment account used by the pension participant with a loan repayment directed by the participant made in contribution with other payments owed by the participant on the payment account.

17. The method of claim 11, further comprising:
determining an origination fee as a function of reduced interest costs incurred by the participant.

18. The method of claim 11, further comprising:
originating a plurality of disbursement proceeds from the liquidity account.

19. A method of managing a pension-based account including a liquidity account held by a pension participant within a pension plan, comprising:
receiving input data from the pension participant;
storing data in a computer means relating to demographic data, actuarial estimates, and social security data based on the pension participant;
determining an adequate retirement amount with the computer means for the pension participant;
calculating expected pension-based assets at retirement with the computer means based on currently held retirement account values;
comparing calculated expected assets at retirement to the determined adequate retirement amount to generate a pension comparison;
adjusting expected assets at retirement with the computer means as a function of a pension-based account transaction based on the input data from the pension participant;
communicating the pension comparison and the adjusted expected assets to the participant, whereby the participant is provided information regarding retirement and to effect of a considered pension-based account transaction; and
receiving directions from the pension participant regarding the pension account.

20. The method of claim 19, further comprising:
calculating a retirement security index with the computer means based on the calculated expected assets at retirement and the determined adequate retirement amount; and
communicating the index to the pension participant to track changes in the pension-based accounts as a function of pension-based transactions, such that the participant may monitor the impact of transactions on the pension-based account.

21. The method of claim 20, further comprising:
expressing the retirement security index as a range functionally related to estimated probabilities.

22. The method of claim 19, further comprising:
comparing the calculated expected assets at retirement after a pension-based account transaction to the determined adequate retirement account to generate a revised comparison; and
communicating the revised comparison to the participant.

23. The method of claim 19, further comprising:
determining an estimated annuity to support the determined adequate retirement amount.

24. The method of claim 19, wherein communicating the pension comparison to the participant comprises:
graphically illustrating to the pension participant the effect of considered pension-based transactions on the pension-based account.

25. The method of claim 19, further comprising:
originating a plurality of pension-based loans from the pension-based account.

26. A system for the management of pension liquidity for a plurality of pension accounts each held by a respective pension participant within a pension plan, comprising:
computer means electronically storing signals indicative of a liquidity account within a respective one of the plurality of pension accounts;
display means displaying data to the pension participant of a respective one of the plurality of pension accounts,:
data input means electronically transmitting and executing a participant directed transaction relating to the respective pension account; and said computer means determining disbursement proceeds resulting from the respective liquidity account and crediting the disbursement proceeds to a payment account while monitoring the participant directed transaction.

27. The system as defined in claim 26, further comprising:

said computer means debiting the payment account or another payment account to credit the liquidity account in response to a participant direction to service the disbursement proceeds.

28. The system as defined in claim 26, wherein said computer means credits the disbursement proceeds to a payment account unsecured against the pension-based account.

29. The system as defined claim 26, wherein said computer means aggregates a minimum repayment for various pension-based loans to determine a minimum loan repayment to the liquidity account.

30. A system for securitizing a loan with a pension-based account of a respective pension participant within a pension plan, comprising:

computer means electronically storing a plurality of signals indicative of a liquidity account within a respective one of the plurality of pension accounts;

data input means electronically executing a participant directed transaction relatingto a respective pension-based account;

a promissory note created by the participant in response to the data input means and held as an asset by the liquidity account;

conveying means electronically conveying a security representing rights in the promissory note and obtaining loan disbursement proceeds;

loan servicing means servicing the conveyed security to repay the disbursed proceeds without liquidating investments within the pension-based account; and the computer means crediting the repaid disbursement proceeds to the pension-based account.

31. The system of claim 30, wherein the loan servicing means comprises:

a payment account repaying distributed proceeds with other payments owed by the participant on, the payment account.

32. The system of claim 30, wherein:

the computer means aggregates a plurality of securities each representing rights of a respective promissory note; and the conveying means electronically conveys the aggregated plurality of securities to a loan fund.

33. The system of claim 30, further comprising:

loan distribution means transferring loan disbursement proceeds to a payment account unsecured against the pension-based account.

34. The system of claim 30, further comprising:

a payment account associated with a respective liquidity account; and the loan servicing means repays the loan disbursement proceeds from the payment account.

35. A system for the management of a pension-based account including a liquidity account held by a respective pension participant within a pension plan, comprising:

a retirement planning means outputting to each pension participant a trackable retirement security index related to an adequate retirement amount for the participant and an expected pension-based asset amount at retirement based on currently held retirement amount values;

a retirement security monitoring means monitoring an impact of an anticipated transaction on the retirement security index; and a retirement security optimization means outputting to each participant a plurality of recommended pension account contribution rates determined by computer means, whereby the participant has information to monitor and control retirement security.

36. The system of claim 35, further comprising:

reporting means periodically providing the participant with graphically illustrated statements demonstrating the participant's retirement security behavior and its effect on the retirement security index.

37. The system of claim 35, further comprising:

retirement security detection means detecting a liquidity account of a participant with a high retirement security risk.

* * * * *

UNITED STATES PATENT AND TRADEMARK OFFICE
CERTIFICATE OF CORRECTION

PATENT NO. : 5,878,405
DATED : March 2, 1999
INVENTOR(S) : James K. Grant et al.

It is certified that error appears in the above-indentified patent and that said Letters Patent is hereby corrected as shown below:

In column 31, line 66, change "aliquidity" to --a liquidity--.

In column 33, line 43, after "on" delete --,--.

Signed and Sealed this

Twenty-second Day of June, 1999

Attest:

Q. TODD DICKINSON

Attesting Officer     Acting Commissioner of Patents and Trademarks